(12) United States Patent
De Groot

(10) Patent No.: US 7,933,025 B2
(45) Date of Patent: Apr. 26, 2011

(54) SINUSOIDAL PHASE SHIFTING INTERFEROMETRY

(75) Inventor: Peter De Groot, Middletown, CT (US)

(73) Assignee: Zygo Corporation, Middlefield, CT (US)

( * ) Notice: Subject to any disclaimer, the term of this patent is extended or adjusted under 35 U.S.C. 154(b) by 321 days.

(21) Appl. No.: 11/958,175

(22) Filed: Dec. 17, 2007

(65) Prior Publication Data

US 2008/0180679 A1   Jul. 31, 2008

Related U.S. Application Data

(60) Provisional application No. 60/870,453, filed on Dec. 18, 2006.

(51) Int. Cl.
  *G01B 9/02* (2006.01)
(52) U.S. Cl. ....................................... 356/514
(58) Field of Classification Search .......... 356/511–514, 356/519
  See application file for complete search history.

(56) References Cited

U.S. PATENT DOCUMENTS

| | | | |
|---|---|---|---|
| 4,594,003 A | 6/1986 | Sommargren | |
| 4,639,139 A | 1/1987 | Wyant et al. | |
| 5,343,404 A | 8/1994 | Girgis | |
| 5,398,113 A | 3/1995 | de Groot | |
| 5,450,205 A | 9/1995 | Sawin et al. | |
| 5,473,434 A | 12/1995 | de Groot | |
| 6,181,420 B1 | 1/2001 | Badami et al. | |
| 6,359,692 B1 | 3/2002 | de Groot | |
| 6,690,218 B2 | 2/2004 | Goldblatt | |
| 6,924,898 B2 | 8/2005 | Deck | |
| 7,564,568 B2 | 7/2009 | de Groot et al. | |
| 2006/0023225 A1 | 2/2006 | Tobben et al. | |
| 2007/0200943 A1 | 8/2007 | de Groot et al. | |
| 2007/0206201 A1 | 9/2007 | de Groot | |
| 2008/0180679 A1 | 7/2008 | de Groot | |
| 2008/0266571 A1 | 10/2008 | Deck | |
| 2008/0285041 A1* | 11/2008 | Ocelic et al. ................ 356/450 |

OTHER PUBLICATIONS

International Search Report.
Bönsch, G. and Bohme, H., "Phase determination of Fizeau interferences by phase shifting interferometry," Optik 82 161-164 (1989).
Creath, K., "Choosing a phase measurement algorithm for measurement of coated LIGO optics," Proc. SPIE 4101, pp. 47-56 (2000).
deGroot, "Optical Metrology" Encyclopedia of Optics, vol. 3, pp. 2100-2101 Wiley-VCH Publishers (2004).
de Groot and Deck, L.L., "New algorithms and error analysis for sinusoidal phase shifting interferometry," SPIE 7063 (2008).
de Groot, P., "Measurement of transparent plates using wavelength-tuned phase shifting interferometry," Appl. Opt. 39(16), pp. 2658-2663 (2000).

(Continued)

Primary Examiner — Hwa S. A Lee
(74) Attorney, Agent, or Firm — Fish & Richardson P.C.

(57) ABSTRACT

Disclosed is a method that includes combining a first light beam and at least a second light beam to form a combined light beam, introducing a sinusoidal phase shift with a frequency f between a phase of the first light beam and a phase of the second light beam, recording at least one interference signal based on a modulation of the combined light beam in response to the sinusoidal phase shift, where the interference signal includes at least three different frequency components, and outputting the information. For each interference signal, information related to the difference in optical path lengths of the first and second light beam is determined by comparing the intensity of the at least three different frequency components of the interference signal.

82 Claims, 19 Drawing Sheets

OTHER PUBLICATIONS de Groot, P., "Phase-shift calibration errors in interferometers with spherical Fizeau cavities", Applied Optics, vol. 34, No. 16 (Jun. 1995).

de Groot, P., "Long-wavelength laser diode interferometer for surface flatness measurement", Proc. SPIE 2248, Optical measurements and sensors for the process industries, pp. 136-140 (1994).

de Groot, P., "20-frame sinusoidal phase shifting Summary of data acquisition, processing & calibration", Zygo (Oct. 2008).

de Groot, Peter, "Design of error-compensating algorithms for sinusoidal phase shifting interferometry", Applied Optics, vol. 48, No. 35, pp. 6788-6796 (Dec. 2009).

P. de Groot, "Vibration in phase shifting interferometry," J. Opt. Soc. Am. A., 12(2), pp. 354-365 (1995).

Dorrio, B.V. Blanco-Garci'a, C., et al., "Phase error calculation in a Fizeau interferometer by Fourier expansion of the intensity profile," Appl. Opt. 35(1), pp. 61-64 (1996).

Dubois, "Phase-map measurements by interferometry with sinusoidal phase modulation and four integrating buckets ," J. Opt. Soc. Am. A 18, 1972-1979 (2001).

Falaggis, Konstantinos et al., "Phase measurement through sinusoidal excitation with application to multi-wavelength interferometry", Journal of Optics A: Pure Appl. Opt 11, pp. 1-11 (2009).

Freischlad, K., Koliopoulos, C.L. et al., "Fourier description of digital phase-measuring interferometry," J. Opt. Soc. Am. A 7(4), pp. 542-551 (1990).

Gradshteyn, I.S. and Ryzhik, I.M., "Table of integrals, series and products," 973, Academic Press (1980).

P. Hariharan "Digital phase-stepping interferometry: effects of multiply reflected beams," Appl. Opt. 26(13) 2506-2507 (1987).

P. Hariharan, "Phase-stepping interferometry with laser diodes: effect of changes in laser power with output wavelength" Appl. Opt. 28, pp. 27-28 (1989).

Hibino, K., Oreb, B.F., et al., "Phase shifting for nonsinusoidal waveforms with phase-shift errors," JOSA A, 12, (4), pp. 761-768 (1995).

Ishii, Y., Chen, and Murata, K., "Digital phase-measuring interferometry with a tunable laser diode," Opt. Lett. 12, pp. 233-235 (1987).

Malacara, D., Servin, M. et al., Interferogram Analysis for Optical Testing, p. 174 (New York: Marcel Dekker, 1998).

Malacara, D., Servin, M. et al., Interferogram Analysis for Optical Testing, pp. 216-275 (New York: Marcel Dekker, 1998).

R.C. Moore and F.H. Slaymaker, "Direct measurement of phase in a spherical-wave Fizeau interferometer," Appl. Opt. 19 (13), pp. 2196-2200 (1980).

Onodera, R. and Ishii, Y., "Phase-extraction analysis of laser-diode phase-shifting interferometry that is insensitive to changes in laser power", J. Opt. Soc. Am. A 13, p. 139 (1996).

Sasaki, H. Okazaki, and M. Sakai, "Sinusoidal phase modulating interferometer using the integrating-bucket method," Appl. Opt. 26, 1089 (1987).

Sasaki and H. Okazaki, "Analysis of measurement accuracy in sinusoidal phase modulating interferometry," Appl. Opt. vol. 25, No. 18, 3152 (1986).

Sasaki, T. Okamura, and T. Nakamura, "Sinusoidal phase modulating Fizeau interferometer," Appl. Opt. 29, 512 (1990).

Sasaki, O. and Takahashi, K., "Sinusoidal phase modulating interferometer using optical fibers for displacement measurement," Appl. Opt. 27, 4139 (1988).

Sasaki, O., Kuwahara, R. et al., "Sinusoidal wavelength-scanning interferometric reflectometry," Proc. SPIE 3740, pp. 618-621 (1999).

Sasaki, O., Nakada, T., et al., "Exact measurements of surface profiles of a glass plate by a superluminescent diode interferometer," Opt. Eng. 38(10), pp. 1679-1682 (1999).

Schwider, J. et al., "Digital wave-front measuring interferometry: some systematic error sources," Appl. Opt., vol. 22, No. 21 pp. 3421-3432 (Nov. 1983).

Surrel, Y., "Additive noise effect in digital phase detection," Appl. Opt. 36(1), pp. 271-276 (1997).

van Wingerden, J. et al., "Linear approximation for measurement errors in phase shifting interferometry," Appl. Opt. 30(19), pp. 2718-2729 (1991).

Wang, X. et al., "All-fiber sinusoidal phase-modulating laser diode interferometer insensitive to the intensity change of the light source," Proc. SPIE 4601, pp. 109-114 (2001).

Wyant, J.C. et al., "An optical profilometer for surface characterization of magnetic media," ASLE Trans. 27, p. 101 (1984).

Wyant, J.C., "Use of an ac Heterodyne Lateral Shear Interferometer with Real-Time Wavefront Correction Systems," Appl. Opt. 14, p. 2622 (1975).

Zhang, C., and Wang, X., "Sinusoidal phase-modulating laser diode interferometer for measuring angular displacement," Opt. Eng. 43(12), pp. 3008-3013 (2004).

Hibino, Kenichi et al., "Suppression of Multiple-Beam Interference Noise in Testing an Optical-Parallel Plate by Wavelength-Scanning Interferometry", Optical Review, vol. 9, No. 2, pp. 60-65 (2002).

Ishii, Yukihiro et al., "Phase-Shifting Fizeau Interference Microscope with a Wavelength-Shifted Laser Diode", Opt. Eng., vol. 42, No. 1, pp. 60-67 (Jan. 2003).

International Search Report and Written Opinion dated Sep. 29, 2010, corresponding to Int'l. Appln. No. PCT/US2010026921.

\* cited by examiner

Sensitivity to Phase Shift Nonlinearity at Various Orders

| Order<br>Algorithm | n=2 | n=3 | n=4 | n=5 |
|---|---|---|---|---|
| 4 sample | 0.27 | 0.44 | 0.09 | 0.37 |
| 8 sample | 0.36 | 0.20 | 0.26 | 0.09 |
| 16 sample | 0.00 | 0.01 | 0.00 | 0.05 |

FIG. 17

SINUSOIDAL PHASE SHIFTING INTERFEROMETRY

CROSS-REFERENCE TO RELATED APPLICATIONS

This application claims priority to Provisional Patent Application No. 60/870,453, entitled "SINUSOIDAL PHASE SHIFTING INTERFEROMETRY," filed on Dec. 18, 2007, the entire contents of which are incorporated herein by reference.

BACKGROUND

This disclosure relates to phase-shifting interferometry.

Interferometric optical techniques are widely used to measure optical thickness, flatness, and other geometric and refractive index properties of precision optical components such as glass substrates used in lithographic photomasks.

For example, one can use an interferometer to combine a measurement wavefront reflected from a measurement surface with a reference wavefront reflected from a reference surface to form an optical interference pattern. Spatial variations in the intensity profile of the optical interference pattern correspond to phase differences between the combined measurement and reference wavefronts caused by, for example, variations in the profile of the measurement surface relative to the reference surface. Phase-shifting interferometry (PSI) can be used to accurately determine the phase differences and the corresponding profile of the measurement surface.

In linear PSI, a time dependent phase shift which varies linearly in time is introduced between the reference and measurement wavefronts. The optical interference pattern is recorded for each of multiple phase-shifts between the reference and measurement wavefronts to produce a series of optical interference patterns that span a full cycle of optical interference (e.g., from constructive, to destructive, and back to constructive interference). The optical interference patterns define a series of intensity values for each spatial location of the pattern, wherein each series of intensity values has a sinusoidal dependence on the phase-shifts with a phase difference equal to the phase difference between the combined measurement and reference wavefronts for that spatial location. Using numerical techniques known in the art, the phase difference for each spatial location is extracted from the sinusoidal dependence of the intensity values. These phase differences can be used to determine information about the test surface including, for example, a profile of the measurement surface relative the reference surface. Such numerical techniques are referred to as linear phase-shifting algorithms.

The phase-shifts in PSI can, for example, be produced by a modulating means which changes the optical path length from the measurement surface to the interferometer relative to the optical path length from the reference surface to the interferometer. For example, the reference surface can be moved relative to the measurement surface or a modulator may be placed in one of the beam paths. Alternatively, the phase-shifts can be introduced for a constant, non-zero optical path difference by changing the wavelength of the measurement and reference wavefronts. The latter application is known as wavelength tuning PSI and is described, e.g., in U.S. Pat. No. 4,594,003 to G. E. Sommargren. The ability of certain types of modulating means (e.g. piezoelectric transducers, wavelength tunable lasers, etc) to produce a linear phase shifts may be limited, due to, for example, bandwidth limitations.

The interference signal in a PSI system is typically detected by a conventional camera system, converted to electronic data, and read out to a computer for analysis. In such applications, the optical interference signal is imaged onto an array of pixels. Charge accumulates at each pixel at a rate that depends on the intensity of the incident light. The charge value at each pixel is then read out, or transferred to a data processing unit.

SUMMARY

In sinusoidal PSI, a time dependent phase shift which varies sinusoidally in time is introduced between the reference light and measurement light. An optical interference pattern is recorded for each of multiple phase-shifts between the reference and measurement wavefronts to produce a series of optical interference patterns in response to the sinusoidal phase shift. As in linear PSI, for each spatial location of the pattern, the optical interference patterns define an interference signal made up of a series of intensity values. However, unlike linear PSI, each interference signal has a complicated, non-sinusoidal dependence on the phase-shifts. Using numerical techniques, the phase difference for each spatial location is extracted from this complicated dependence of the intensity values. This information can then provide, for example, a profile of the measurement surface relative to the reference surface. Such numerical techniques are generally referred to as sinusoidal phase shifting algorithms.

For sufficiently large sinusoidal phase shifts, the resulting interference signal is composed of several frequency components at multiples of the sinusoidal phase shift frequency. In some embodiments, sinusoidal phase shifting algorithms compare the intensities of these frequency components to extract the phase difference. By selectively weighting the frequency components used in the comparison, the algorithm compensates for errors caused by, for example, noise or calibration errors.

A PSI system operating at a relatively low phase shift rate may be susceptible to noise. The fact that the measurement is not instantaneous means that other time-dependent phenomena, such as mechanical vibrations, tend to be convolved into the data, resulting in measurement errors. With sinusoidal PSI, in some embodiments, the modulating means need only operate with a relatively narrow bandwidth around the sinusoidal phase shift frequency, which may allow for a high phase shift rate.

In certain sinusoidal PSI systems, the rate at which the interference signal can be accumulated and read out, known as the camera frame rate, limits the useable sinusoidal phase shift frequency. In some embodiments, a camera system is used which avoids this limitation.

In one aspect, a method includes combining a first light beam and at least a second light beam to form a combined light beam, introducing a sinusoidal phase shift with a frequency f between a phase of the first light beam and a phase of the second light beam, recording at least one interference signal based on a modulation of the combined light beam in response to the sinusoidal phase shift, where the interference signal includes at least three different frequency components, and outputting the information. For each interference signal, information related to the difference in optical path lengths of the first and second light beam is determined by comparing the intensity of the at least three different frequency components of the interference signal.

In some embodiments the comparing includes assigning a respective weight to the intensity of each of the at least three different frequency components to provide a corresponding weighted intensity, and comparing the weighted intensities.

In some embodiments each of the at least three different frequency components has a frequency which is an integer multiple of f.

In some such embodiments, the comparing further includes comparing a sum of the weighted intensities corresponding to the at least three different frequency components at even multiples of f to a sum of the weighted intensities corresponding to the at least three different frequency components at odd multiples of f.

In some such embodiments, the respective weights are selected so that the effect of an error on the intensity of a first of the at least three different frequency components is compensated by the effect of the error on the intensity of a second of the at least three different frequency components.

In some such embodiments, the frequencies of the first and second frequency components are same-parity integer multiples of f.

In some embodiments the at least three different frequency components include at least one frequency component with frequency greater than twice f. For example, in some embodiments each of the at least three different frequency components has a frequency greater than three times f.

In some embodiments, the respective weights are selected to compensate an error. For example, in some embodiments the respective weights are selected so that the effect of the error on the weighted intensity corresponding to a first frequency component is compensated by the effect of the error on the weighted intensity corresponding to a second frequency component.

In some embodiments the error includes a variation in the excursion of the sinusoidal phase shift from a nominal value.

In some embodiments the error includes additive random noise.

In some embodiments the error comprises additive synchronous noise. For example, in some embodiments the additive synchronous noise includes noise at frequency v", and the at least three different frequency components do not comprise a component with frequency v".

In some embodiments the error includes multiplicative synchronous noise.

In some embodiments the error includes synchronous vibration noise. For example, in some embodiments the synchronous vibration noise comprises noise at low frequencies, and the at least three different frequency components have frequencies greater than the low frequencies.

In some embodiments the error includes phase shift nonlinearity. For example, in some embodiments the nonlinearity includes a quadratic nonlinearity, and the at least three frequency components do not include a frequency component with a frequency equal to 2f.

In some embodiments, the error includes phase shift calibration error.

In some embodiments the error includes phase shift timing offset error.

In general, in some embodiments the recording includes sampling the interference signal at a sample rate. For example, in some embodiments the Nyquist frequency corresponding to the sample rate is greater than the frequency of each of the at least three different frequency components. As another example, in some embodiments the Nyquist frequency corresponding to the sample rate is greater than three times f. As another example, in some embodiments the Nyquist frequency corresponding to the sample rate is greater than seven times f.

In some embodiments, the sinusoidal phase shift $\phi(t)$ is of the form $$\phi(t)=u\cos[\alpha(t)+\varphi]$$

where u is the excursion of the sinusoidal phase shift, $\varphi$ is a timing offset, and $$\alpha(t)=2\pi ft$$

is the scaled time dependence with f equal to the frequency of the sinusoidal phase shift.

For example, in some embodiments the recording includes, during a cycle of the sinusoidal phase shift, acquiring intensity data $\bar{g}_j$ for N successive sample positions each corresponding to a time $t_j$, where j=0, 1, 2, ... N−1. Some embodiments include arranging the sample positions symmetrically about the midpoint of a cycle of the sinusoidal phase shift such that $$\cos(\alpha(t_j)+\varphi)=\cos(\alpha(t_{N-1-j})+\varphi)$$

for j=0, 1, 2, ... (N−1)/2.

Some embodiments include providing a sinusoidal phase shift excursion u large enough that the interference signal recorded in response to the phase shift comprises frequency components with frequencies at three distinct integer multiples of f.

Some embodiments include providing a sinusoidal phase shift excursion u great enough that the interference signal recorded in response to the phase shift comprises frequency components at the first six integer multiples of f.

In some embodiments u>π/2 radians.

In some embodiments the determining includes assigning a first respective weight $w_j^{(1)}$ to each of the intensity data $\bar{g}_j$ to provide a corresponding first weighted intensity, assigning a second respective weight $w_j^{(2)}$ to each of the intensity data $\bar{g}_j$ to provide a corresponding second weighted intensity, calculating the ratio of the sum of first weighted intensities to the sum of the second weighted intensities, and determining information related to the difference in optical path lengths based on the ratio. Some such embodiments include selecting the first and second respective weights to compensate an error. In some embodiments the timing offset is set to a nominal value $\varphi=0$. In some embodiments the excursion u is set to a nominal value.

For example, in some embodiments $$w_j^{(1)}=\Gamma_{even}\times(h_{odd})_j$$

and $$w_j^{(2)}=\Gamma_{odd}\times(h_{even})_j$$

where $(h_{odd})_j$ is the $j^{th}$ element of a sampling vector $h_{odd}$, $(h_{even})_j$ is the $j^{th}$ element of a sampling vector $h_{even}$ and $\Gamma_{even}$ and $\Gamma_{odd}$ are normalization coefficients based on a model of the interference signal. In some embodiments the sampling vectors $h_{odd}$, $h_{even}$ are selected subject to the constraints $$\sum_j (h_{odd})_j (h_{even})_j = 0.$$

$$\sum_j (h_{odd})_j \cos[v(\alpha_j+\varphi)] = 0$$

for v = 2, 4, 6...

and $$\sum_j (h_{even})_j \cos[v(\alpha_j+\varphi)] = 0$$

for v = 1, 3, 5... .

In some embodiments the error includes a variation in the excursion of the sinusoidal phase shift from the nominal value. In some embodiments, the sampling vectors $h_{odd}$, $h_{even}$ are selected such that the ratio of the normalization coefficients remains stable in response to the variation of the excursion from the nominal value.

In some embodiments the error includes additive random noise. For example, in some embodiments the additive random noise includes mean noise. In some such embodiments sampling vectors $h_{odd}$, $h_{even}$ are selected subject to the constraint $$\frac{\Gamma_{odd}}{p_{odd}} = \frac{\Gamma_{even}}{p_{even}}$$

where $$p_{odd} = \sqrt{\sum_j (h_{odd})_j^2},$$

$$p_{even} = \sqrt{\sum_j (h_{even})_j^2}.$$

In some embodiments additive random noise includes root mean square noise. In some such embodiments the sampling vectors $h_{odd}$, $h_{even}$ are selected subject to the constraint that the magnitude of the quantities $\Gamma_{odd}/p_{odd}$ and $\Gamma_{even}/p_{even}$ be maximized where $$p_{odd} = \sqrt{\sum_j (h_{odd})_j^2},$$

$$p_{even} = \sqrt{\sum_j (h_{even})_j^2}.$$

In some embodiments the error includes additive synchronous noise. For example, in some embodiments the additive synchronous noise includes noise at frequency $v''$, and the sampling vectors $h_{odd}$, $h_{even}$ are selected subject to the constraint that the magnitude of the quantities $$\sum_j (h_{odd})_j \cos[v''(\alpha_j + \varphi)]$$

and $$\sum_j (h_{even})_j \cos[v''(\alpha_j + \varphi)]$$

be minimized.

In some embodiments the error includes multiplicative synchronous noise. For example, in some embodiments the multiplicative synchronous noise includes noise at frequency $v''$, and the sampling vectors $h_{odd}$, $h_{even}$ are selected to minimize a predicted sensitivity of the determined information to the noise at frequency $v''$, based on the model of the interference signal. As another example, in some embodiments the multiplicative synchronous noise includes a sinusoid with frequency f oscillating in phase with the sinusoidal phase shift; and the sampling vectors $h_{odd}$, $h_{even}$ are selected subject to the constraint that the magnitude of the quantities $$\sum_j (h_{odd})_j \cos[(\alpha_j + \varphi)]$$

and $$\sum_j (h_{even})_j \cos[(\alpha_j + \varphi)]$$

be minimized. For example, in some embodiments the common source includes a laser diode, the providing a sinusoidal phase shift includes sinusoidally varying the wavelength of a diode laser light source and the multiplicative synchronous noise is diode laser intensity noise.

In some embodiments the error includes synchronous vibration noise. In some embodiments, the synchronous vibration noise includes noise at frequency $v''$, and sampling vectors $h_{odd}$, $h_{even}$ are selected to minimize a predicted sensitivity of the determined information to the noise at frequency $v''$, based on the model of the interference signal.

In some embodiments the error includes nonlinearity of the sinusoidal phase shift. In some embodiments the nonlinearity is a quadratic nonlinearity, and the sampling vectors $h_{odd}$, $h_{even}$ are selected subject to the constraint that the magnitude of the quantities $$\sum_j (h_{odd})_j \cos[2(\alpha_j + \varphi)]$$

and $$\sum_j (h_{even})_j \cos[2(\alpha_j + \varphi)]$$

be minimized.

In some embodiments the error includes phase shift timing offset error. In some such embodiments sampling vectors $h_{odd}$, $h_{even}$ are selected subject to the constraint that the magnitude of the quantity $$\frac{\Gamma_{even}(\varphi + \delta\varphi)\Gamma_{odd}(\varphi)}{\Gamma_{odd}(\varphi + \delta\varphi)\Gamma_{even}(\varphi)} - 1$$

be minimized, where $\phi$ is a nominal value for the timing offset and $\delta\phi$ is the deviation from the nominal value.

In some embodiments the determining includes calculating the inverse tangent of the ratio.

In some embodiments the recording includes acquiring intensity data $\bar{g}_j$ for N=8 successive measurement frames each corresponding to a time $t_j$ such that $\alpha(t_j)=j\pi/4+\pi/8$ for j=0, 1, 2, . . . 7. The determining includes calculating a value for the phase difference $\theta$ between the phase of first light beam and the phase of the second light beam based on the expression:

$$\theta = \tan^{-1}\left(\frac{1.6647(g_1 - g_2)}{-g_0 + g_1 + g_2 - g_3}\right),$$

where $g_i = \bar{g}_i + \bar{g}_{7-i}$, for i=0, 1, 2, 3; and outputting information related to the phase difference. In some embodiments, the sinusoidal phase shift excursion u is set to a nominal value of 2.93 radians and the timing offset $\phi$ is set to a nominal value of 0.

In some embodiments the recording comprises acquiring intensity data $\bar{g}_i$ for N=16 successive measurement frames each corresponding to a time $t_j$ such that $\alpha(t_j)=j\pi/8+\pi/16$ for $j=0, 1, 2, \ldots 7$. The determining includes calculating a value for the phase difference $\theta$ between the phase of first light beam and the phase of the second light beam based on the expression:

$$\theta = \tan^{-1}\left(\frac{2.646(-g_0+g_7)+7.248(g_1-g_6)+}{2.507(-g_2+g_5)+6.758(-g_3+g_4)}\over{1.375(g_0+g_7)+1.410(g_1+g_6)+}\atop{8.099(-g_2-g_5)+5.314(g_3+g_4)}\right),$$

where $g_i = \bar{g}_i + \bar{g}_{15-i}$, for $i=0, 1, \ldots 7$, In some embodiments, the sinusoidal phase shift excursion u is set to a nominal value of 5.9 radians and the timing offset $\phi$ is set to a nominal value of 0.

In some embodiments the comparing includes calculating a frequency transform of the interference signal at each of at least three frequencies and comparing the magnitudes of the calculated frequency transforms to determine information related to the difference in optical path lengths of the first and second light beam. In some embodiments the at least three frequencies are integer multiples of the sinusoidal phase shift frequency. Some embodiments include extracting the phases of one or more of the calculated frequency transforms, and determining additional information based on the extracted phases. In some embodiments the additional information is a value of the excursion of the sinusoidal phase shift and/or a value of a timing offset.

In some embodiments the frequency transforms are Fourier Transforms, Fast Fourier Transforms, and/or Discrete Cosine Transforms. In some embodiments the Nyquist frequencies of the Fast Fourier Transforms are greater than three times f. In some embodiments the Nyquist frequencies of the Discrete Cosine Transforms are greater than three times f.

In some embodiments the combining includes directing the first light beam to a first surface, directing the second light beam to a second surface, and forming an optical interference image from the combined light beam. The at least one interference signals each correspond to different location on the interference image. In some embodiments, the information comprises a surface profile of one of the surfaces.

In another aspect, in some embodiments, a system includes an interferometer which during operation combines a first light beam and a second light beam derived from a common source to form combined light beam; a phase shifting component which during operation introduces a sinusoidal phase shift between a phase of the first light beam and a phase of the second light beam; a photo detector positioned to detect the combined light beam and provide at least one interference signal based on the modulation of the combined light beam in response to the phase shift; and an electronic controller coupled to the phase shifting component and the photo detector. The controller is configured to determine information related to the difference in optical path lengths of the first and second light beam by comparing the intensity of at least three frequency components of the interference signal.

In some embodiments the interferometer is a Fizeau, Linnik, Mirau, Fabry-Perot, Twyman-Green, Fizeau, point-diffraction, Michelson, or Mach-Zeder interferometer.

In some embodiments the interferometer is an unequal path interferometer, and the phase-shifting component is configured to vary the wavelength at least one of the light beams.

In some embodiments the phase shifting component is a wavelength tunable diode laser.

In some embodiments the first light beam is directed to a surface and the phase-shifting component is a transducer coupled to the surface.

In some embodiments the phase-shifting component is an acousto-optic modulator

In some embodiments the phase-shifting component is an electro-optic modulator.

In some embodiments the interferometer, during operation, directs the first light beam to a first surface, directs the second light beam to a second surface and forms an optical interference image from the combined light beam. The at least one interference signals each correspond to different location on the interference image. For example, in some embodiments the information comprises a surface profile of one of the surfaces.

In another aspect, in some embodiments, a method includes combining a first light beam and a second light beam derived from a common source to form combined light beam; introducing a sinusoidal phase shift between a phase of the first light beam and a phase of the second light beam, the sinusoidal phase shift with frequency f comprising at least two consecutive cycles; determining information related to the difference in optical path lengths of the first and second light beam based on an interference signal produced in response to the phase shift during the at least two cycles; and outputting the information.

In some embodiments the determining information is based on more than four intensity values of the interference signal during each cycle of the sinusoidal phase shift.

In some embodiments wherein f is greater than 50 Hz, greater than 1 kHz, or greater than 100 kHz.

In another aspect, in some embodiments an apparatus includes an interferometer system configured to combine a first light beam with a second light beam to form an optical interference pattern. The interferometer includes a modulator configured to introduce a sinusoidal phase shift with frequency f between a phase of the first light beam and a phase of the second light beam, wherein the sinusoidal phase shift comprises repetitive cycles. The apparatus also includes a camera system positioned to measure the optical interference pattern. The camera system is configured to, during the repetitions of the cycles, separately accumulate time-integrated image frames corresponding to different sample positions of the cycle.

In some embodiments the different portions of the cycle include N sample positions $p_i$ where $i=0, 1, \ldots N-1$ arranged symmetrically about the midpoint of the cycle. The separately accumulated frames include N/2 frames $f_i$ where $i=0, 1, \ldots (N-1)/2$. Frame $f_i$ corresponds to sample positions $p_i$ and $p_{N-1-i}$.

In some embodiments f is greater than 10 kHz, greater than 100 kHz, greater than 250 kHz. greater than 1 MHz.

Some embodiments also include an electronic processor coupled to the camera system and configured to convert the time integrated frames form the camera system into digital information for subsequent processing. In some embodiments the subsequent processing comprises applying a sinusoidal phase shift algorithm to determine information related to the difference in optical path lengths of the first and second light beam. In some embodiments the algorithm compensates an error.

In some embodiments the camera system is configured to send the time integrated image frames to the electronic processor at a rate less than 1 kHz.

In another aspect, in some embodiments, a method includes combining a first light beam with a second light beam to form an optical interference pattern; introducing a sinusoidal phase shift between a phase of the first light beam and a phase of the second light beam, wherein the sinusoidal phase shift comprises repetitive cycles; and during the repetitions of the cycles, separately accumulating time-integrated image frames corresponding to different sample positions of the cycle.

In some embodiments the different portions of the cycle include N sample positions $p_i$, where i=0, 1, ... N−1, arranged symmetrically about the midpoint of the cycle. The separately accumulated frames include N/2 frames $f_i$ where i=0, 1, ..., (N−1)/2. Frame $f_i$ corresponds to sample positions $p_i$ and $p_{N-1-i}$.

In another aspect, in some embodiments, a method includes combining a first light beam and a second light beam derived from a common source to form combined light beam; introducing a sinusoidal phase shift with a frequency f between a phase of the first light beam and a phase of the second light beam; recording at least one interference signal based on the modulation of the combined light beam in response to the sinusoidal phase shift by, during a cycle of the sinusoidal phase shift, acquiring intensity data $\bar{g}_i$ for N=4 successive measurement frames each corresponding to a time $t_j$ such that $\alpha(t_j)=j\pi/2$ for j=0, 1, 2, 3; and determining the phase difference θ between the phase of the first light beam and the phase of the second based on the expression:

$$\tan(\theta) = \frac{1.4176(\bar{g}_0 - \bar{g}_2)}{\bar{g}_0 - \bar{g}_1 + \bar{g}_2 - \bar{g}_3};$$

and outputting information related to the phase difference.

In some embodiments the sinusoidal phase shift excursion is set to a nominal value of 2.45 radians and the timing offset between the sinusoidal phase offset and the acquisition of the intensity values is set to a nominal value of 0 radians.

In another aspect, in some embodiments, a method includes combining a first light beam and a second light beam derived from a common source to form combined light beam; introducing a sinusoidal phase shift with a frequency f between a phase of the first light beam and a phase of the second light beam; recording at least one interference signal based on the modulation of the combined light beam in response to the sinusoidal phase shift by, during a cycle of the sinusoidal phase shift, acquiring intensity data $\bar{g}_j$ for N=8 successive measurement frames each corresponding to a time $t_j$ such that $\alpha(t_j)=j\pi/4+\pi/8$ for j=0, 1, 2, ... 7; determining the phase difference θ between the phase of the first light beam and the phase of the second based on the expression:

$$\tan(\theta) = \left(\frac{1.6647(g_1 - g_2)}{-g_0 + g_1 + g_2 - g_3}\right),$$

where $g_i = \bar{g}_i + \bar{g}_{7-i}$, for i=0, 1, 2, 3; and outputting information related to the phase difference.

In some embodiments the sinusoidal phase shift excursion u is set to a nominal value of 2.93 radians and the timing offset and the timing offset between the sinusoidal phase shift and the acquisition of the intensity values is set to a nominal value of 0 radians.

In another aspect, in some embodiments, a method includes combining a first light beam and a second light beam derived from a common source to form combined light beam; introducing a sinusoidal phase shift with a frequency f between a phase of the first light beam and a phase of the second light beam; recording at least one interference signal based on the modulation of the combined light beam in response to the sinusoidal phase shift by, during a cycle of the sinusoidal phase shift, acquiring intensity data $\bar{g}_i$ for N=16 successive measurement frames each corresponding to a time $t_j$ such that $\alpha(t_j)=j\pi/8+\pi/16$ for j=0, 1, 2, ... 7; determining the phase difference θ between the phase of the first light beam and the phase of the second based on the expression:

$$\tan(\theta) = \left(\frac{2.646(-g_0 + g_7) + 7.248(g_1 - g_6) +}{1.375(g_0 + g_7) + 1.410(g_1 + g_6) +} \frac{2.507(-g_2 + g_5) + 6.758(-g_3 + g_4)}{8.099(-g_2 - g_5) + 5.314(g_3 + g_4)}\right),$$

where $g_i = \bar{g}_i + \bar{g}_{15-i}$, for i=0, 1, ... 7; and outputting information related to the phase difference.

In some embodiments the sinusoidal phase shift excursion is set to a nominal value of 5.9 radians and the timing offset between the sinusoidal phase shift and the acquisition of the intensity values is set to a nominal value of 0 radians;

Embodiments may include any of the features or characteristics found in the various embodiments described above.

As used herein, "light" and "optical" does not only refer to visible electromagnetic radiation; rather such terms include electromagnetic radiation in any of the ultraviolet, visible, near-infrared, and infrared spectral regions.

Unless otherwise defined, all technical and scientific terms used herein have the same meaning as commonly understood by one of ordinary skill in the art to which this invention belongs. In case of conflict with any document incorporated by reference, the present disclosure controls.

Other feature sand advantages will be apparent from the following detailed description.

DESCRIPTION OF DRAWINGS

FIG. 5c is a plot of the intensity of the first for frequency components of the exemplary interference signal shown in FIG. 5a.

FIG. 17 is a table showing algorithm sensitivity to phase shift nonlinearity at various orders.

DETAILED DESCRIPTION

Figure 1:
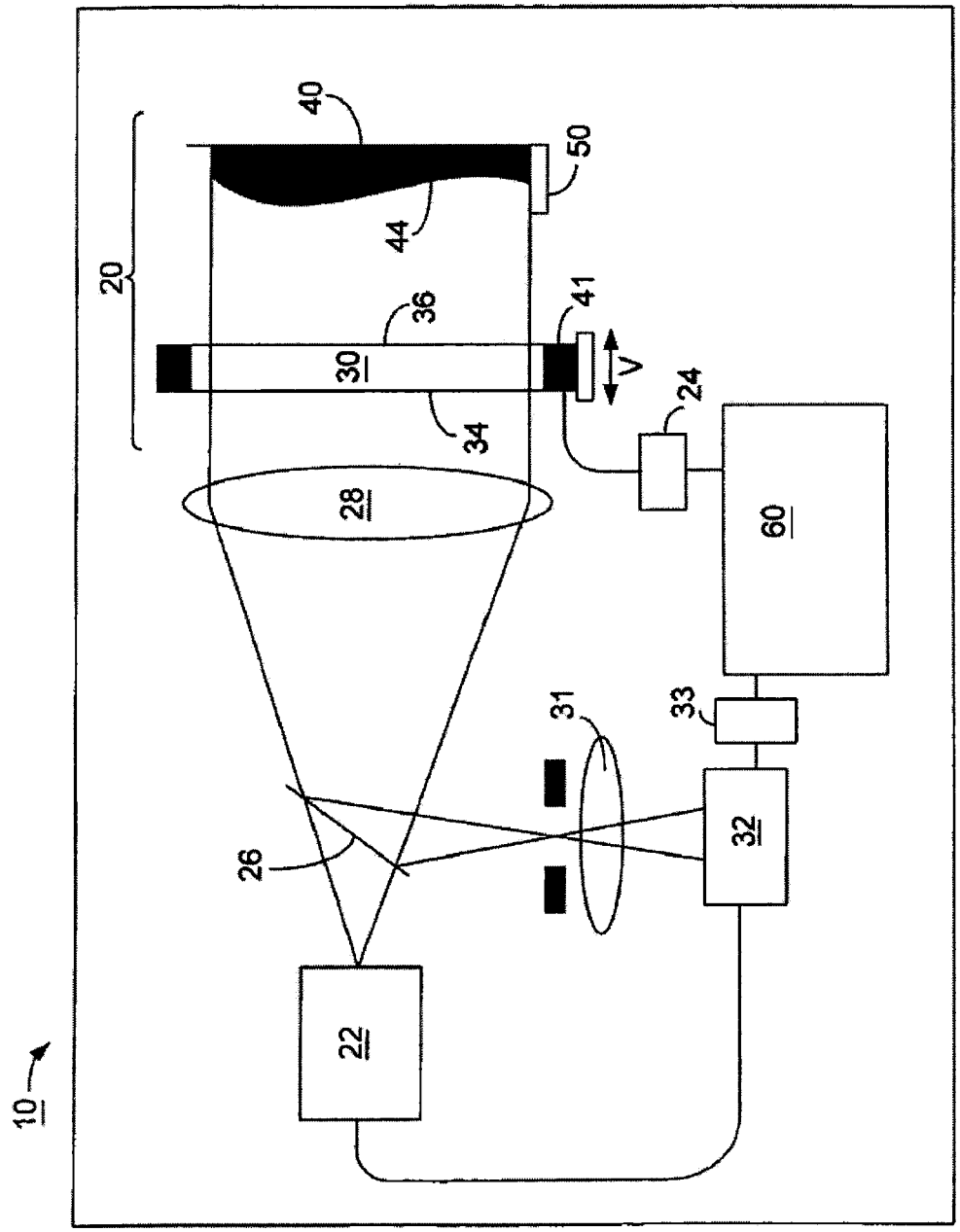
FIG. 1 is a schematic diagram of a sinusoidal phase-shifting interferometer system featuring mechanical phase shifting.

A schematic diagram of a sinusoidal phase-shifting interferometric system 10 is shown in FIG. 1. Sinusoidal phase-shifting interferometric system 10 is adapted to measure the profile of a front surface 44 of a measurement object 40. Sinusoidal phase-shifting interferometric system 10 includes a Fizeau interferometer 20, a mount 50 for positioning measurement object 40 relative to interferometer 20, and a controller 60 such as a computer. Sinusoidal phase-shifting interferometric system 10 includes a light source 22 (e.g., a laser), a beam splitter 26, a collimating optic 28, an imaging optic 31, a charge coupled device (CCD) camera 32, and a frame grabber 33 for storing images detected by CCD camera 32. Also included in sinusoidal phase-shifting interferometric system 10 is a reference flat 30, which is mounted on a translatable stage 41. The translatable stage is in communication with controller 60 through a driver 24. The back surface of reference flat 30 defines a reflective reference surface 36 for the interferometer, whereas a front surface 34 of reference flat 30 has an antireflection coating and may be additionally or alternatively tilted with respect to back surface 36, so that contributions of reflections from front surface 34 in any subsequent measurements are reduced or eliminated.

During operation, controller 60 causes driver 24 to move translatable stage 41, thereby dithering reference flat 30 back and forth and changing the optical path difference between front surface 44 and reflective reference surface 36 of reference flat 30. The position of reference surface 36 is varied sinusoidally in time thereby producing a sinusoidal phase shift. Controller 60 also causes frame grabber 33 to store an image of the optical interference pattern detected by CCD camera 32 at multiple acquisition times during the sinusoidal phase shifting. The rate at which image frames are acquired is known as the frame rate. Frame grabber 33 sends the images to controller 60 for analysis. In some embodiments, the measurement object is mounted on the translatable stage, and the front surface 44 is translated to produce the sinusoidal phase shift. In some embodiments, both the measurement and reference objects are mounted on movable stages.

During operation, light source 22 directs light at a wavelength λ to beam splitter 26, which then directs the light to collimating lens 28 to collimate the light. Reference surface 36 reflects a first portion of the light to form a reference wavefront, and surface 44 of measurement object 40 reflect an additional portion of the light to form a measurement wavefront. Lenses 28 and 31 then direct the reference and measurement wavefronts onto CCD camera 32 where they form an optical interference image.

CCD camera 32 acquires the interference signal as a function of time as the position of the reference surface 36 is varied sinusoidally in time. Controller 60 stores and analyzes the recorded interference signal, as described below.

In typical embodiments, the sinusoidal phase shift frequency is, for example, about 50 Hz or more, about 200 Hz or more, or about 1 kHz or more. Embodiments featuring camera systems described below employ a sinusoidal phase shift frequency greater than 100 kHz or even greater than 1 MHz.

Controller 60 analyzes the interference signal to determine the phase difference phase difference θ(x, y) that corresponds to the optical path length (OPL) variation between the measurement and reference surfaces, such that:

$$\theta(x, y) = 4\pi n L(x, y)\frac{1}{\lambda} + \Phi \tag{1}$$

where the surfaces are separated by a physical gap L, n is the refractive index of material in the gap, and Φ is an overall constant phase. The x and y dependence of gap L and phase difference θ are shown explicitly in Eq. 1 to show the spatial variation in phase difference, which is captured by the different elements in the detector. In some embodiments, refractive index n may also have an x and y dependence. Extraction of this phase variation profile, or phase map, is the information that is typically of interest in phase shifting interferometry. For example, assuming that the surface profile of the reference surface is well-characterized, the surface profile of the measurement surface can be extracted from θ(x, y). In the interest of brevity, the x and y dependence of the phase difference θ will be suppressed henceforth.

In some embodiments, during a full cycle of the sinusoidal phase shift, controller 60 samples the interference signal at N sample positions in the cycle. Controller 60 stores the sampled interference signal in the form of a series of N intensity values $\bar{g}_j$, where j=0, 1, . . . N−1. Controller 60 calculates the phase difference using an expression of the form:

$$\theta = \tan^{-1}\left(\frac{\sum_{j=0}^{N-1} w_j^{(1)} \bar{g}_j}{\sum_{j=0}^{N-1} w_j^{(2)} \bar{g}_j}\right) \tag{2}$$

where $w_j^{(1)}$ is a first weight corresponding to intensity value $\bar{g}_j$ and $w_j^{(2)}$ is a second weight corresponding to intensity value $\bar{g}_j$.

In some embodiments, N is an integer value equal to four or more, eight or more, or sixteen or more. For a given sinusoidal phase shift frequency f, the number of sample positions per cycle N defines the Nyquist frequency of the sampling. As described below, the Nyquist frequency, equal to one half the inverse of the sampling rate, relates, for example, to the maximum frequency at which the sinusoidal phase shift algorithm accurately measure frequency components of the interference signal.

In certain embodiments, the values of weights $w_j^{(1)}$ and $w_j^{(2)}$ are selected, based on a model of the interference signal. Based on the model, in some embodiments, the algorithm can be adapted to compensate for measurement errors caused by, for example, noise or calibration error. One example of such a model is described in detail below.

In various embodiments, the performance of the algorithm of Eq. (2) depends on the excursion (i.e., the half amplitude) of the sinusoidal phase shift, as described in detail below. In certain embodiments, the half amplitude of the phase shift is, for example about $\pi/2$ radians or more, about $\pi$ radians or more, or, $2\pi$ radians or more.

Figure 2:
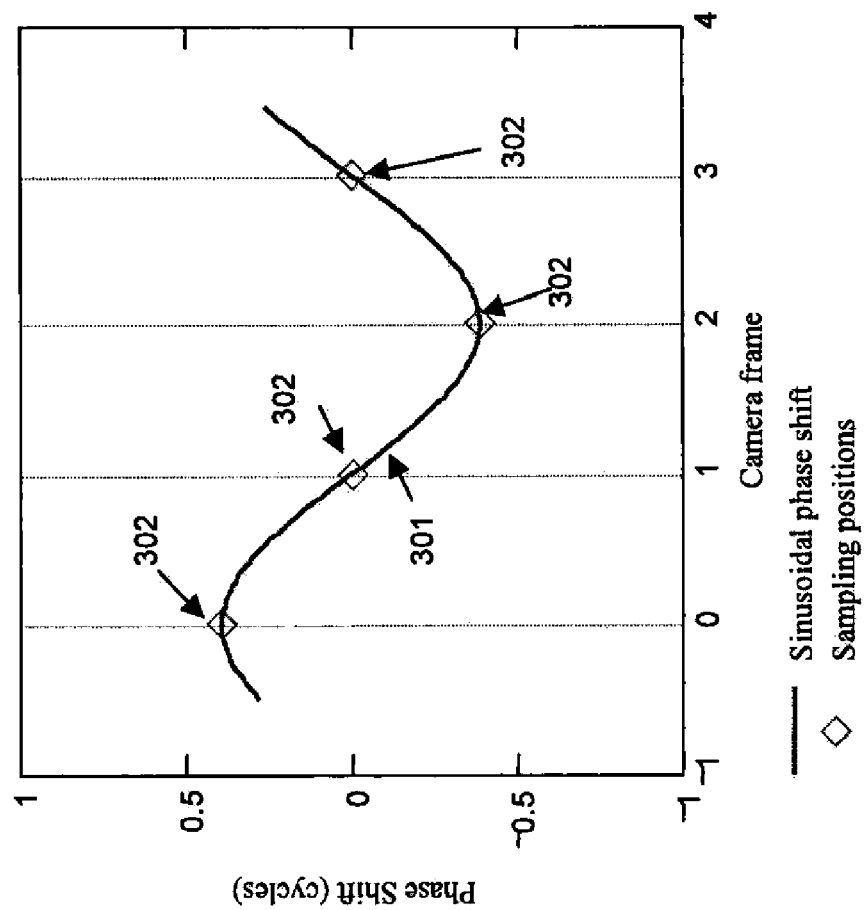
FIG. 2 is a schematic of the data acquisition scheme for a four sample position sinusoidal phase shift algorithm.

For example, as shown in FIG. 2, in some embodiments, a controller drives a phase shifting mechanism to provide a sinusoidal phase shift 301 with a half amplitude of 2.45 radians. During a full cycle of the sinusoidal phase shift, the controller stores an interference signal as a series of four intensity values $\bar{g}_j$, where j=0, 1, 2, 3. The intensity values are acquired at N=4 sample positions 302 arranged symmetrically about the midpoint of the sinusoidal phase shift cycle. Controller 60 calculates the phase difference using $$\tan(\theta) = \frac{1.4176(\bar{g}_0 - \bar{g}_2)}{\bar{g}_0 - \bar{g}_1 + \bar{g}_2 - \bar{g}_3}, \tag{3}$$

Figure 3:
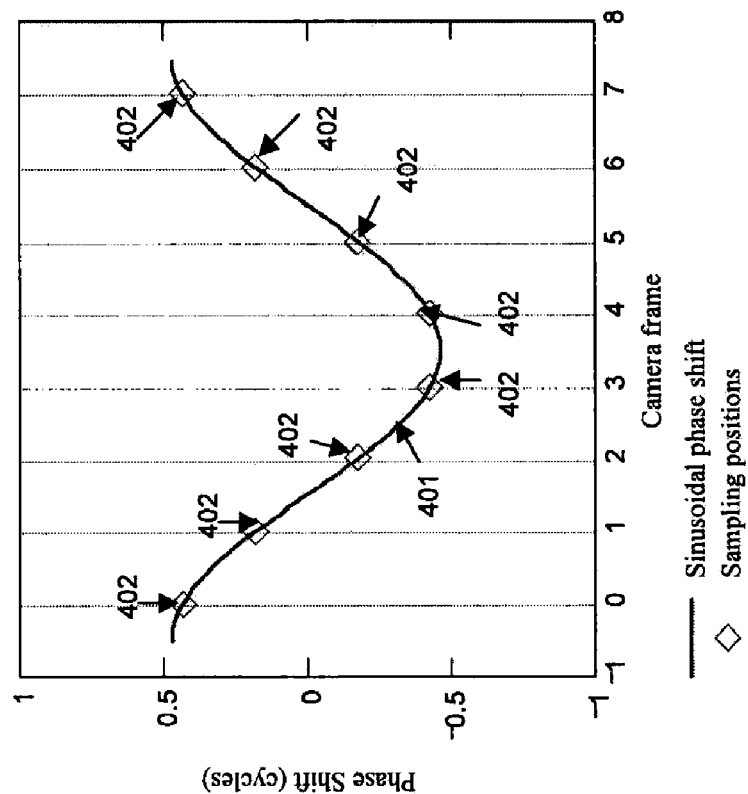
FIG. 3 is a schematic of the data acquisition scheme for an eight sample position sinusoidal phase shift algorithm.

As another example, as shown in FIG. 3, in some embodiments, a controller drives a phase shifting mechanism to provide a sinusoidal phase shift 401 with an excursion (i.e., half-amplitude) of 2.93 radians. During a full cycle of the sinusoidal phase shift, the controller stores an interference signal as a series of eight intensity values $\bar{g}_j$, where j=0, 1 ... 7. The intensity values are acquired at N=8 sample positions 402 arranged symmetrically about the midpoint of the sinusoidal phase shift cycle. The controller calculates the phase difference using $$\theta = \tan^{-1}\left(\frac{1.6647(g_1 - g_2)}{-g_0 + g_1 + g_2 - g_3}\right), \tag{4}$$

where $$g_j = \bar{g}_j + \bar{g}_{7-j}; \tag{5}$$
$$j = 0, 1 \ldots 3.$$

Figure 4:
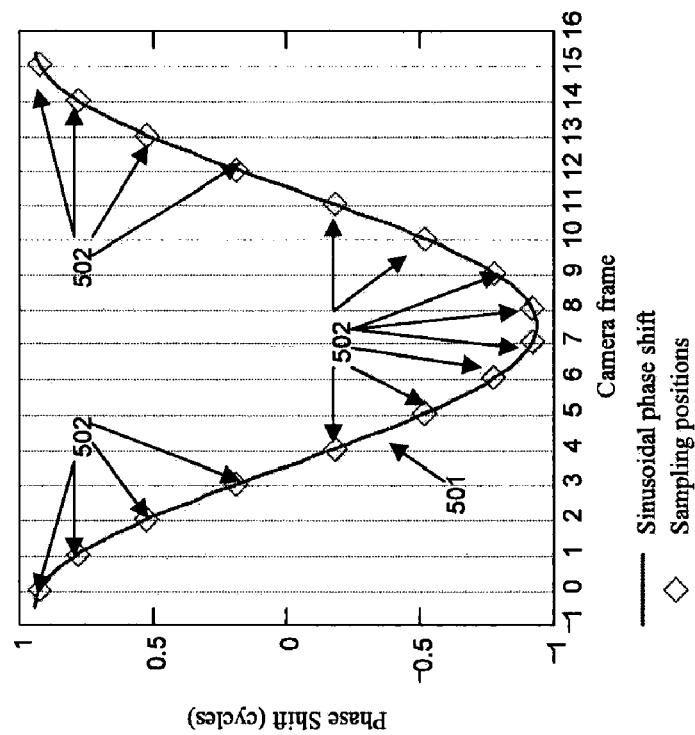
FIG. 4 is a schematic of the data acquisition scheme for a sixteen sample position sinusoidal phase shift algorithm.

As another example, as shown in FIG. 4, in some embodiments, controller 60 drives phase shifting mechanism to provide a sinusoidal phase shift with and excursion of 5.4 radians. During a full cycle of the sinusoidal phase shift 401, controller 60 stores an interference signal in the form of a series of sixteen intensity values $\bar{g}_j$, where j=0, 1 ... 15. The intensity values are acquired at sixteen sample positions 402 arranged symmetrically about the midpoint of the sinusoidal phase shift cycle. Controller 60 calculates the phase difference using $$\tan(\theta) = \frac{\begin{array}{l}2.646(-g_0 + g_7) + 7.248(g_1 - g_6) + \\ 2.507(-g_2 + g_5) + 6.758(-g_3 + g_4)\end{array}}{\begin{array}{l}1.375(g_0 + g_7) + 1.410(g_1 + g_6) + \\ 8.099(-g_2 - g_5) + 5.314(g_3 + g_4)\end{array}} \tag{6}$$

where by symmetry $$g_j = \bar{g}_j + \bar{g}_{15-j}; j=0,1\ldots 7 \tag{7}$$

In certain embodiments, data acquisition is repeated over multiple cycles of the sinusoidal phase shift, phase differences calculated for each cycle, and the calculated values averaged to reduce noise. For example, in some embodiments, the intensity data is acquired over multiple consecutive cycles. Controller 60 calculates the phase difference based on intensity data acquired during a first cycle of the sinusoidal phase shift while simultaneously acquiring intensity data during the next cycle.

In some embodiments, the intensity values acquired at each sample position are averaged over multiple cycles. Controller 60 calculates the phase difference by substituting the averaged intensity values for the values $\bar{g}_j$ in Eq. (2).

In various embodiments, the weighting values $w_j^{(1)}$ and $w_j^{(2)}$ are selected based on the following model. In embodiments of a sinusoidal phase shifting interferometer, the normalized interference signal corresponding to a single image point in the optical interference image is modeled as $$g(\theta,t) = q\{1 + V\cos[\theta + \phi(t)]\} \tag{8}$$

where V is the fringe visibility, q is the average intensity and $\phi(t)$ is the time dependent phase shift.

Figure 6A:
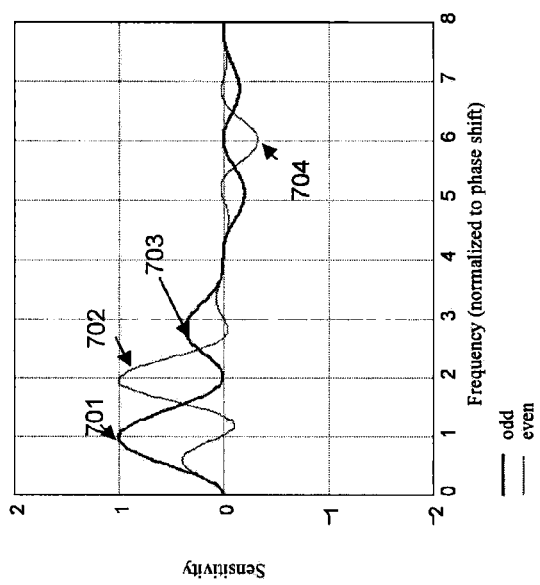
FIG. 6a is a plot of the frequency sensitivity of the sampling vectors used in a four sample position algorithm.

The sinusoidal phase shift is a cosine:

$$\phi(t) = u\cos[\alpha(t) + \phi] \tag{9}$$

where u is the phase shift excursion in radians, $\phi$ is a timing offset which depends on, for example, delay between the triggering of the time dependent phase shift with respect the triggering of data acquisition (e.g., by the CCD camera driven by frame grabber). The scaled time dependence of the cosine is $$\alpha(t) = 2\pi f t \tag{10}$$

where f is the sinusoidal phase shift frequency, e.g., in Hz. The resulting intensity signal is a complicated function composed multiple frequency components. FIG. 6a shows an exemplary model interference signal 601.

Figure 5A:
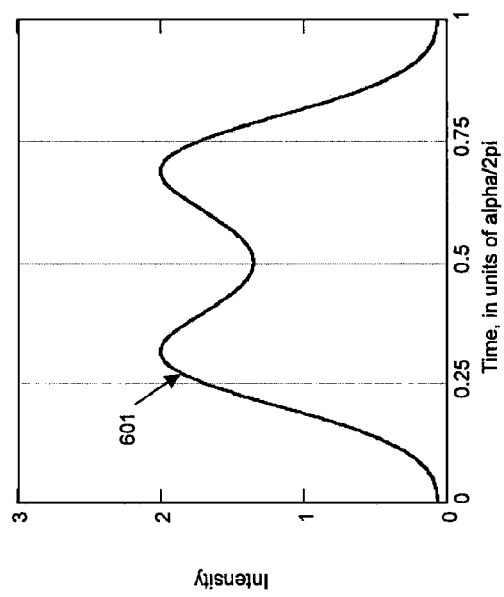
FIG. 5a is a plot of the intensity of an exemplary interference signal recorded in response to a sinusoidal phase shift.
Figure 5C:
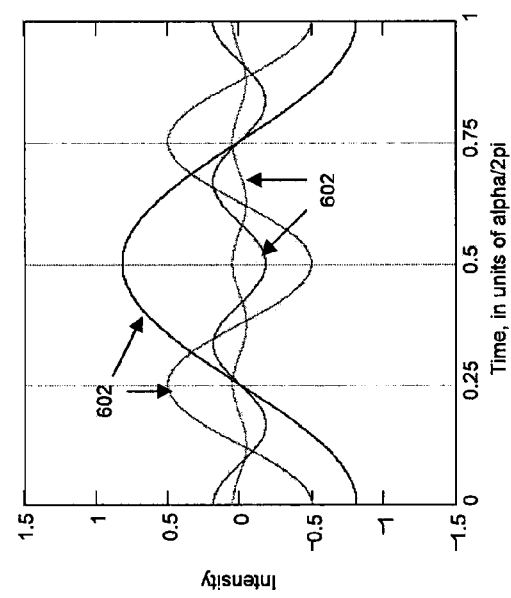
Figure 5B:
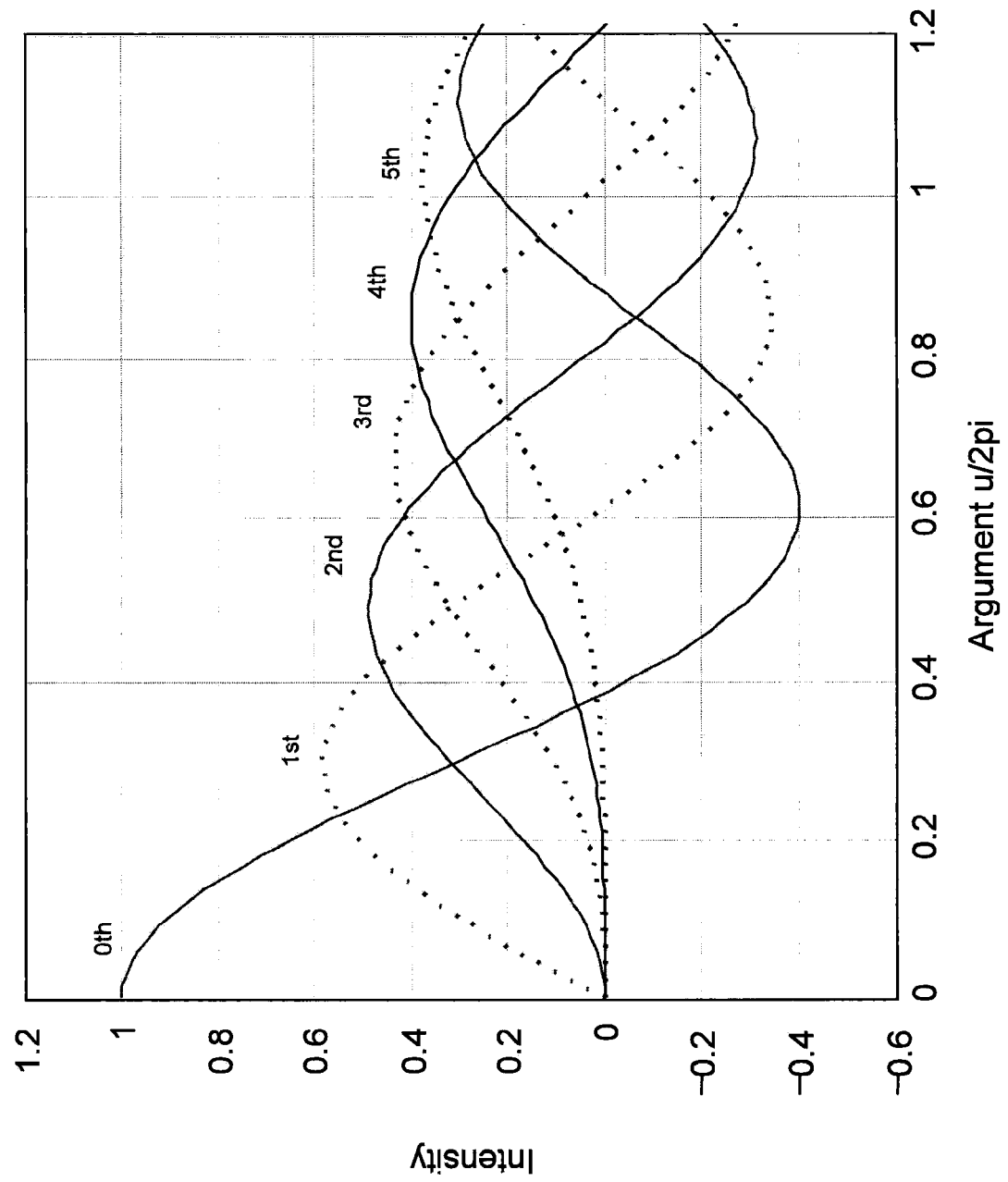
FIG. 5b is a plot of first six Bessel functions of the first kind.

The model interference signal can be expanded as $$g(\theta,\alpha) = q + qV\cos(\theta)\cos[\phi(\alpha)] - qV\sin(\theta)\sin[\phi(\alpha)] \tag{11}$$

with $\alpha$ taking the place of the time variable, since it is linearly proportional to time. The Jacobi-Anger expansion $$\exp[iu\cos(\alpha)] = J_0(u) + 2\sum_{v=1}^{\infty} i^v J_v(u)\cos(v\alpha), \tag{12}$$

gives $$g(\theta,\alpha) = qD(\theta) + qV\cos(\theta)C(\alpha) + qV\sin(\theta)S(\alpha) \tag{13}$$

where $$D(\theta) = 1 + VJ_0(u)\cos(\theta) \tag{14}$$

$$C(\alpha) = 2 \sum_{v=2,4,6...}^{\infty} (-1)^{v/2} J_v(u) \cos[v(\alpha + \varphi)] \qquad (15)$$

$$S(\alpha) = 2 \sum_{v=1,3,5...}^{\infty} (-1)^{(v+1)/2} J_v(u) \cos[v(\alpha + \varphi)]. \qquad (16)$$

and where $J_v(u)$ represents the $v^{th}$ Bessel function of the first kind. FIG. 5b shows the behavior of the first five Bessel functions.

The time-dependent portion of the interference signal is composed of frequency components at harmonics (i.e., integer multiples) of the fundamental time dependent phase shift frequency. FIG. 5c shows the frequency components 602 of the exemplary interference signal 601 at the first four harmonics of the phase shift frequency. The relative phases of these frequency components are independent of the interference phase difference θ. Thus unlike linear phase shifting, the phase difference cannot be determined by a phase estimation of the interference modulation. However, in sinusoidal PSI, the strengths of the frequency components at even harmonics of the sinusoidal phase shift frequency are proportional to the cosine of θ and the strengths of the frequency components at the odd harmonics are proportional to the sine of θ. Thus, comparing the relative strengths of the even and odd frequency components provides quadrature values for θ.

In various embodiments, detection of the interference signal includes collecting photons over a dwell time also known as an integrating bucket. The time dependent phase shifting continues during this dwell time, effectively integrating the signal. The value of the intensity at a given value of α integrated over the time interval $\beta/2\pi f$ is $$\bar{g}(\theta, \alpha) = \int_{\alpha-\beta/2}^{\alpha+\beta/2} g(\theta, \alpha') d\alpha'. \qquad (17)$$

The effect of the frame integration is to attenuate the frequency components at higher harmonics by a factor $$B(v) = \frac{\sin(v\beta/2)}{v\beta/2}. \qquad (18)$$

The model interference signal can be expanded as $$\bar{g}(\theta,\alpha) = qD(\theta) + qV\cos(\theta)\bar{C}(\alpha) + qV\sin(\theta)\bar{S}(\alpha) \qquad (19)$$

where $D(\theta)$ is as in Eq. (14) and $$\bar{S}(\alpha) = 2 \sum_{v=1,3,5...}^{\infty} (-1)^{(v+1)/2} B(v) J_v(u) \cos[v(\alpha + \varphi)] \qquad (20)$$

$$\bar{C}(\alpha) = 2 \sum_{v=2,4,6...}^{\infty} (-1)^{v/2} B(v) J_v(u) \cos[v(\alpha + \varphi)]. \qquad (21)$$

In some embodiments, the frequencies of the frequency components which make up the interference signal are well known because they are tied to the fundamental sinusoidal phase shift frequency f and its harmonics. In typical embodiments, the sinusoidal phase shift frequency can be established with high precision. For example, in the embodiment shown in FIG. 1, driver 24 could include a high precision signal generator which drives translatable stage 41 to oscillate at a precisely known frequency, thereby produce a sinusoidal phase shift with a precisely know frequency. Further, because of the weighting Bessel functions appearing in Eqs. (20) and (21), for sinusoidal phase shifts having sufficiently small amplitudes only frequency components at the first few harmonics are of significant strength. This allows for sinusoidal phase shifting algorithm employing a discrete window with only a few sampling points per cycle of phase shift, tuned to the frequencies of interest.

Further, in typical embodiments, the timing offset φ is a fixed value characteristic of the timing of the sinusoidal phase shifting drive signal. For example, in embodiments where φ is set to zero or π, the model interference signal $\bar{g}(\theta,\alpha)$ includes only cosine functions that are symmetric about α=0. In this case, the real-valued, discretely-sampled Fourier cosine transform of the interference signal is $$FT_R[\bar{g}(\theta, \alpha)] = \frac{\sum_j \bar{g}_j(\theta)\cos(v\alpha_j)}{\sum_j \cos(v\alpha_j)^2}, \qquad (22)$$

where samples are taken at a sequence of P scaled times $\alpha_j$ starting at $\alpha^0$ and spaced by $\Delta\alpha$:

$$\alpha_j = j\Delta\alpha + \alpha^0, \qquad (23)$$

where $$j = 0,1,2\ldots P-1. \qquad (24)$$

The normalized sampling vector $$(c_{v'})_j = \frac{\cos(v'\alpha_j)}{\sum_j \cos(v'\alpha_j)^2}. \qquad (25)$$

detects the θ-dependent amplitude of the frequency component of model interference signal at the harmonic v', when timing offset φ=0:

$$R_{v'}(\theta) = \sum_j (c_{v'})_j \bar{g}_j(\theta). \qquad (26)$$

Sparse sampling means that the single-frequency transform $R_{v'}(\theta)$ will, in fact, be sensitive to frequencies other than just the selected value v'. The sampling vectors $c_{v'}$ are a chosen to be sensitive only to even or odd harmonics of the sinusoidal phase shift frequency, as the case may be. Additionally, it is desirable that $$\sum_j (c_{v'})_j = 0, \qquad (27)$$

such that that the DC portion of the signal does not influence the result.

A set of candidate frequencies v' are chosen for inclusion in the algorithm for determining the phase difference θ. Sums are taken over the odd and even candidate frequencies to measure the strength of the frequency components of the interference signal at odd and even harmonics of the sinusoidal phase shift frequency:

$$R_{odd}(\theta) = \sum_{v'=odd} \gamma_{v'} \sum_{j} (c_{v'})_j \bar{g}_j(\theta) \qquad (28)$$

$$R_{even}(\theta) = \sum_{v'=even} \gamma_{v'} \sum_{j} (c_{v'})_j \bar{g}_j(\theta), \qquad (29)$$

where the $\gamma_{v'}$ are constant coefficients that weight the contribution of the frequency component of the interference signal at each harmonic to the final result $R_{odd}(\theta)$. This simplifies to $$R_{odd}(\theta) = \sum_{j} (h_{odd})_j \bar{g}_j(\theta) \qquad (30)$$

$$R_{even}(\theta) = \sum_{j} (h_{even})_j \bar{g}_j(\theta) \qquad (31)$$

where the final algorithm coefficient vectors $h_{odd}, h_{even}$ are $$h_{odd} = \sum_{v'=odd} \gamma_{v'} c_{v'} \qquad (32)$$

$$h_{even} = \sum_{v'=even} \gamma_{v'} c_{v'}. \qquad (33)$$

Note that it is desirable that the coefficient vectors be orthogonal $$\sum_{j} (h_{odd})_j (h_{even})_j = 0 \qquad (34)$$

and sensitive only to the appropriate harmonics such that:

$$\sum_{j} (h_{odd})_j \cos[v(\alpha_j + \varphi)] = 0 \qquad (35)$$

for $v = 2, 4, 6\ldots$ $$\sum_{j} (h_{even})_j \cos[v(\alpha_j + \varphi)] = 0 \qquad (36)$$

for $v = 1, 3, 5\ldots$.

Using the model interference signal $\bar{g}(\theta,\alpha)$ with $\phi=0$, the corresponding normalization constants are $$\Gamma_{odd} = 2 \sum_{v=1,3,5\ldots}^{\infty} (-1)^{(v+1)/2} J_v(u) B(v) Q_{odd}(v) \qquad (37)$$

$$\Gamma_{even} = 2 \sum_{v=2,4,6\ldots}^{\infty} (-1)^{v/2} J_v(u) B(v) Q_{even}(v) \qquad (38)$$

for $$Q_{odd}(v) = \sum_{j} (h_{odd})_j \cos[v(\alpha_j + \varphi)] \qquad (39)$$

$$Q_{even}(v) = \sum_{j} (h_{even})_j \cos[v(\alpha_j + \varphi)], \qquad (40)$$

where $\phi$ is at a fixed, known value close to zero. The interference phase angle $\theta$ is then $$\tan(\theta) = \frac{\Gamma_{even}}{\Gamma_{odd}} \frac{R_{odd}(\theta)}{R_{even}(\theta)}. \qquad (41)$$

The above equation represents a basic form for a class of sinusoidal phase shift algorithms. A specific algorithm is defined by choosing specific values for the number of sample points per period P, the sinusoidal phase shift amplitude u, and coefficient vectors $h_{odd}, h_{even}$. Once chosen, these values define the set of weights in Eq. (2):

$$w_j^{(1)} = \Gamma_{even}(h_{odd})_j \qquad (42)$$

$$w_j^{(2)} = \Gamma_{odd} \times (h_{even})_j. \qquad (43)$$

In various embodiments, weighting values are selected to tailor the performance of the sinusoidal phase shifting algorithm to compensating for noise and/or calibration error (e.g., phase excursion calibration error, vibration noise, additive or multiplicative random noise, etc.). Coefficient vectors $h_{odd}$, $h_{even}$ are selected to provide error compensating algorithms. For example, in typical embodiments, coefficient vectors are selected which keep the ratio $\Gamma_{even}/\Gamma_{odd}$ of the normalization constants stable in the presence of disturbances such as errors in the phase shift excursion u and various sources of noise (e.g., additive and multiplicative phase and intensity noise).

In some embodiments, phase shift excursion is sufficiently large (e.g., greater that $\pi/2$ radians) that the sinusoidal phase shift produces an interference signal with strong frequency components at multiple harmonics of the phase shift frequency. Additionally, in preferred embodiments, the system samples the interference signal with a Nyquist frequency equal to several times the sinusoidal phase shift frequency, such that multiple frequency components (i.e. those with frequencies less than the Nyquist frequency) are accurately measured. Under these conditions, the algorithm compares the intensity of multiple (e.g., three or more) frequency components of the interference signal, allowing for improved error compensation. For example, as illustrated in detailed examples described below, in some embodiments, coefficient vectors are constructed so that if the measured intensity of one of the frequency components of the interference signal is changed by a disturbance the effect on the algorithm is balanced by an opposing change in the intensity of one or more additional frequency component. As another example, in some embodiments, also illustrated below, coefficient vectors are constructed so that they are insensitive to frequency components at frequencies where noise levels (e.g., vibrations from the environment) are large.

The following examples describe the selection, based on the model presented above, of the weights appearing in the four, eight and sixteen sample position sinusoidal phase shift algorithms presented in Eqs. (3), (4), and (6) respectively. The performance of each algorithm is analyzed based on the above model.

Referring to FIG. 2, in some embodiments, four camera frames of intensity data are acquired at N=4 sample positions 302 evenly spaced over one period of the sinusoidal phase shift such that $$\alpha_j = j\pi/2 \qquad (44)$$

for j=0, 1, 2, 3. The Nyquist frequency of the data acquisition rate is equally to twice the sinusoidal phase shift frequency. The sinusoidal phase shift amplitude is set to u=2.45 to ensure that both the first and second harmonics contribute to the interference signal. Subject to the constraints imposed by Eqs. (32)-(36), the coefficient vectors are selected to be sensitive to the first and second harmonic of the sinusoidal phase shift frequency:

$$h_{odd} = (-1\ 0\ 1\ 0) \tag{45}$$

$$h_{even} = (-1\ 1\ -1\ 1). \tag{46}$$

The gamma normalizations from Eq. (37) and Eq. (38) for a phase shift excursion u=2.45 are $$\Gamma_{odd} = 1.5718 \tag{47}$$

$$\Gamma_{even} = 2.2283 \tag{48}$$

$$\Gamma_{even}/\Gamma_{odd} = 1.4176. \tag{49}$$

Eq. (41) simplifies to the expression of Eq. (3)

$$\tan(\theta) = \frac{1.4176(\bar{g}_0 - \bar{g}_2)}{\bar{g}_0 - \bar{g}_1 + \bar{g}_2 - \bar{g}_3}. \tag{50}$$

FIG. 6a shows the frequency sensitivity of the coefficient vectors $h_{odd}, h_{even}$. Peaks 701 and 702 indicate that the coefficient vectors are sensitive to frequency components of the interference signal at the first and second harmonic of the sinusoidal phase shift frequency. These frequency components have frequencies at or below the Nyquist frequency, and thus are accurately measured by the algorithm. Peaks 703 and 704 indicate that the coefficient vectors are also sensitive to frequency components at the third and sixth harmonic. However, these frequency components have frequencies above the Nyquist frequency, and thus are not accurately measured by the algorithm. Thus, in determining the phase difference θ the algorithm compares the intensity of two accurately measured frequency components, i.e. the first two frequency components of the interference signal.

Figure 6B:
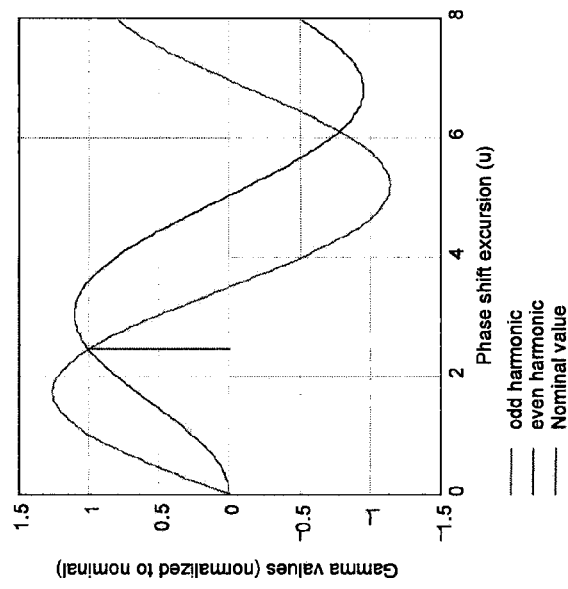
FIG. 6b is a plot of the normalization coefficients as a function of phase shift excursion for a four sample position algorithm.

The sensitivity of the algorithm to frequency components above the Nyquist frequency is unfortunate. For example, that the chosen coefficient vectors sum the frequency components at the first and third harmonics in Eq. (30) with the same sign is unattractive. As a result, as shown in FIG. 6b, the coefficients $\Gamma_{odd}, \Gamma_{even}$ as a function of the sinusoidal phase shift amplitude u cross each other with a high relative slope, leading to high sensitivity to calibration errors. Because of the sub-Nyquist sampling of the harmonics above the second harmonic at the π/2 sampling rate, it is difficult to selectively weight differently, e.g., the frequency components at the first and third harmonics to achieve further improvements in algorithm performance.

Referring to FIG. 3, in some embodiments eight camera frames of intensity data are acquired at sample positions 402 evenly spaced over one period of the sinusoidal phase shift such that $$\alpha_j = j\pi/4 + \pi/8. \tag{51}$$

for j=0, 1, ..., 7.

The Nyquist frequency for this data acquisition rate is equally to four times the sinusoidal phase shift frequency. The sinusoidal phase shift amplitude is set to a value u>π so that the first, second, and third harmonics contribute to the interference signal. Subject to the constraints imposed by Eqs. (32)-(36), the coefficient vectors are selected to be sensitive to the first, second, and third harmonics of the sinusoidal phase shift frequency:

$$h_{odd} = (0\ -1\ 1\ 0\ 0\ 1\ -1\ 0) \tag{52}$$

$$h_{even} = (-1\ 1\ 1\ -1\ -1\ 1\ 1\ -1). \tag{53}$$

The normalizations from Eq. (37) and Eq. (38) for a phase shift excursion u=2.93 are $$\Gamma_{odd} = 2.9432 \tag{54}$$

$$\Gamma_{even} = 4.8996 \tag{55}$$

$$\Gamma_{even}/\Gamma_{odd} = 1.6647. \tag{56}$$

Using the inherent symmetry of the data acquisition, Eq. (41) simplifies to the expression of Eq. (4)

$$\tan(\theta) = \frac{1.6647(g_1 - g_2)}{-g_0 + g_1 + g_2 - g_3}. \tag{57}$$

where $$g_j = \bar{g}_j + \bar{g}_{7-j}; j=0,1,2,3. \tag{58}$$

The frame averaging essentially reduces an eight frame algorithm two four frame algorithms acquired symmetrically about the low point in the sinusoidal phase shift.

Figure 7A:
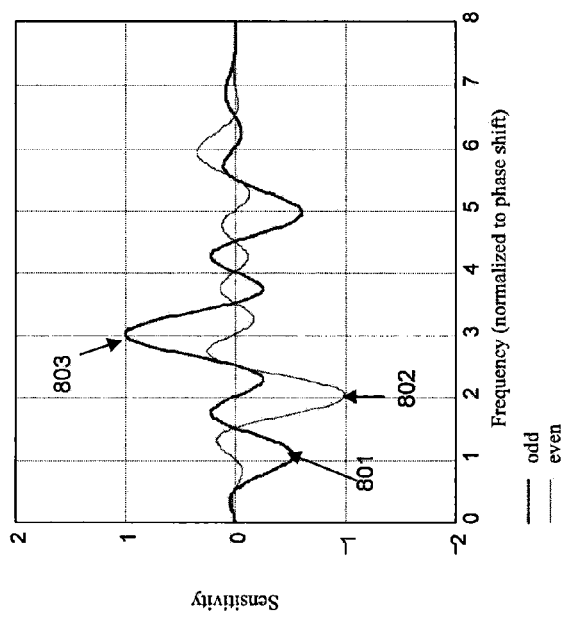
FIG. 7a is a plot of the frequency sensitivity of the sampling vectors used in an eight sample position algorithm.
Figure 7B:
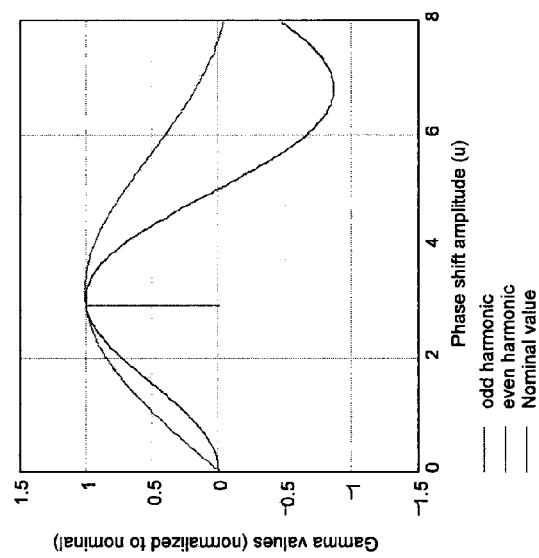
FIG. 7b is a plot of the normalization coefficients as a function of phase shift excursion for an eight sample position algorithm.

FIG. 7a shows the frequency sensitivity of the coefficient vectors $h_{odd}, h_{even}$. Peaks 801, 802, 803 indicate that the coefficient vectors are sensitive frequency components at three harmonics (the first, second, and third) below the Nyquist frequency. Thus, in determining the phase difference θ the algorithm compares the intensity of three frequency components of the interference signal Coefficient vector $h_{odd}$ is selected such that the frequency component of the interference signal at the third harmonic is the dominant contributor to the sum from Eq. (28) The frequency component at the first harmonic is subtracted with approximate one half weighting. This is an advantageous balance of these two frequency components. For example, the effect of an error on the intensity of one of the components will tend to be canceled by the effect of that same error on the other component, thereby compensating for the overall effect of the error on the algorithm. A positive result of this compensation is shown in FIG. 7b. For a phase shift excursion u=2.93, the coefficients $\Gamma_{odd}, \Gamma_{even}$ as a function of the sinusoidal phase shift amplitude u cross each other with a zero relative slope. Thus, as discussed further below, the algorithm will be relatively insensitive to, for example, calibration errors.

Referring to FIG. 4, in some embodiments sixteen camera frames of intensity data are acquired at sample positions 502 evenly spaced over one period of the sinusoidal phase shift such that $$\alpha_j = j\pi/8 + \pi/16. \tag{59}$$

for j=0, 1, ..., 15.

The Nyquist frequency for this data acquisition rate is equal to eight times the sinusoidal phase shift frequency. The sinusoidal phase shift amplitude is set to a value u>π so that frequency components at four or more harmonics contribute to the interference signal. Coefficient vectors $h_{odd}, h_{even}$ and phase shift amplitude u are selected subject to the constraints imposed by Eqs. (32)-(36), along with additional the constraints that $$\Gamma_{even}/\Gamma_{odd} = 1 \tag{60}$$

and that for the widest possible range of values around the nominal phase shift excursion u, $$\frac{d}{du}\Gamma_{even}(u)/\Gamma_{odd}(u) = 0. \tag{61}$$

As described in detail below, these conditions ensure that the algorithm reduces or compensates for the effects of, for example, calibration error in the phase shift amplitude. For example, the above constraints are well satisfied by setting the sinusoidal phase shift amplitude u=5.9, and selecting $$\gamma_1 = 0.49 \tag{62}$$

$$\gamma_2 = 0 \tag{63}$$

$$\gamma_3 = 1.770 \tag{64}$$

$$\gamma_4 = 9.19 \tag{65}$$

$$\gamma_5 = -10 \tag{66}$$

$$\gamma_6 = -10 \tag{67}$$

Using Eq. (37) and Eq. (38) and renormalizing the algorithm coefficients so that $$\Gamma_{odd} = \Gamma_{even} = 40.0, \tag{68}$$

Eq. (41) simplifies to the expression of Eq. (6)

$$\tan(\theta) = \frac{\begin{array}{c}2.646(-g_0+g_7)+7.248(g_1-g_6)+\\2.507(-g_2+g_5)+6.758(-g_3+g_4)\end{array}}{\begin{array}{c}1.375(g_0+g_7)+1.410(g_1+g_6)+\\8.099(-g_2-g_5)+5.314(g_3+g_4)\end{array}} \tag{69}$$

where by symmetry $$g_j = \bar{g}_j + \bar{g}_{15-j}; j=0,1\ldots 7$$

Figure 8A:
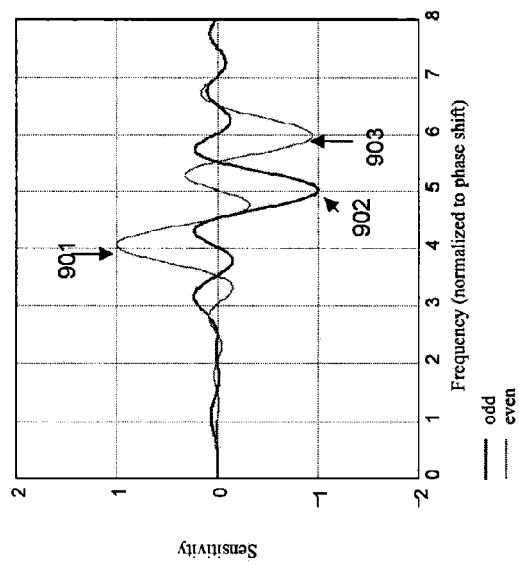
FIG. 8a is a plot of the frequency sensitivity of the sampling vectors used in a sixteen sample position algorithm.
Figure 8B:
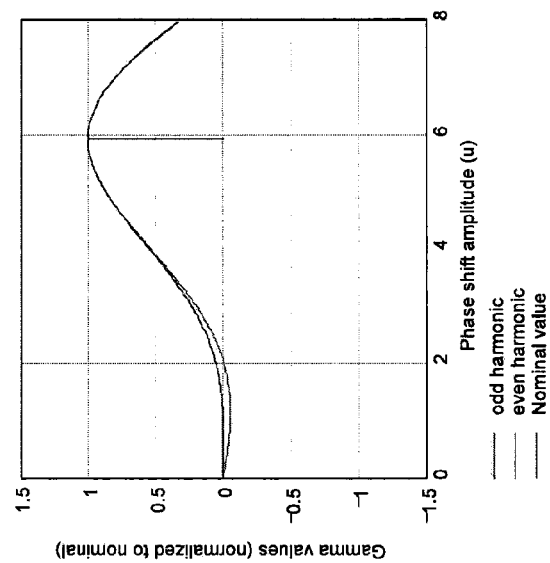
FIG. 8b is a plot of the normalization coefficients as a function of phase shift excursion for a sixteen sample position algorithm.

FIG. 8a shows the frequency sensitivity of the coefficient vectors $h_{odd}, h_{even}$. Peaks 901, 902, and 903 indicate that the coefficient vectors are dominantly sensitive to frequency components at the fourth, fifth, and sixth harmonics. The coefficient vectors also exhibit sensitivity at lower harmonics. As shown in FIG. 8b, the algorithm satisfies the constraints given in Eqs. (60) and (61), and maintains the same ratio $\Gamma_{odd}/\Gamma_{even}$ over a wide range of phase shift excursion values. Thus, as discussed further below, the algorithm will be relatively insensitive to, for example, calibration errors.

In certain embodiments, the sinusoidal phase shifting algorithm compensates for one or more of several types of noise and error. The sinusoidal phase shift excursion u and coefficient vectors $h_{odd}, h_{even}$ are selected as in the examples above, subject to various constraints in order to provide algorithms which reduce the effect of various types of error.

In some embodiments, the phase shifting algorithm reduces or compensates for the effects of additive random noise. Typical sources of purely random, additive noise include thermal noise in a detector. Random noise n(t) generates errors η corresponding to a small phase error ε:

$$\eta = \tan(\theta + \epsilon). \tag{70}$$

Expanding the tangent to $2^{nd}$ order ($\epsilon \ll 1$) for both the η and $\eta^2$, the mean and the mean square errors are $$\langle \epsilon \rangle = -\sin(\theta)\cos(\theta) - \sin^3(\theta)\cos(\theta) + \ldots + \langle \eta \rangle \cos^2(\theta)$$
$$[1 + 2\sin^2(\theta)] - \langle \eta^2 \rangle \sin(\theta)\cos^3(\theta) \tag{71}$$

$$\langle \epsilon^2 \rangle = \cos^4(\theta)[\tan^2(\theta) - 2\langle \eta \rangle \tan(\theta) + \langle \eta^2 \rangle]. \tag{72}$$

Expressing the error in terms of the random noise n(t) sampled as $n_j$ gives $$\eta = \frac{\Gamma_{even}}{\Gamma_{odd}} \frac{R_{odd}(\theta) + N_{odd}}{R_{even}(\theta) + N_{even}} \tag{73}$$

where $$N_{odd} = \sum_j (h_{odd})_j n_j \tag{74}$$

$$N_{even} = \sum_j (h_{even})_j n_j. \tag{75}$$

When the mean value for the noise is zero and that it is uncorrelated from sample to sample, $$\langle n_j \rangle = 0, \tag{76}$$

$$\langle n_i n_j \rangle = 0 \text{ for } i \neq j, \tag{77}$$

$$\langle n_j^2 \rangle = \sigma^2. \tag{78}$$

Consequently, assuming Eq. (27) and Eq. (34), $$\langle N_{odd} \rangle = \langle N_{even} \rangle = 0 \tag{79}$$

$$\langle N_{odd} N_{even} \rangle = 0 \tag{80}$$

$$\langle N_{odd}^2 \rangle = \sigma^2 \sum_j (h_{odd})_j^2 \tag{81}$$

$$\langle N_{even}^2 \rangle = \sigma^2 \sum_j (h_{even})_j^2 \tag{82}$$

Expanding Eq. (73), to second order ($\sigma \ll 1$)

$$\langle \eta \rangle = \tan(\theta)\left[1 + \sigma^2 \left(\frac{p_{odd}}{R_{odd}}\right)^2\right]. \tag{83}$$

$$\langle \eta^2 \rangle = \tan^2(\theta)\left[1 + \sigma^2\left(\frac{p_{odd}}{R_{odd}}\right)^2 + 3\sigma^2\left(\frac{p_{even}}{R_{even}}\right)^2\right] \tag{84}$$

where from Eqs. (81) and (82), respectively, $$p_{odd} = \sqrt{\sum_j (h_{odd})_j^2} \tag{85}$$

$$p_{even} = \sqrt{\sum_j (h_{even})_j^2}. \tag{86}$$

Inserting these equations back into Eqs. (71) and (72), the mean error is $$\langle \epsilon \rangle = \frac{1}{2}\left(\frac{\sigma}{qV}\right)^2\left[\left(\frac{p_{even}}{\Gamma_{even}}\right)^2 - \left(\frac{p_{odd}}{\Gamma_{odd}}\right)^2\right]\sin(2\theta) \tag{87}$$

The RMS error is $$\sqrt{\langle \varepsilon^2 \rangle} = \left(\frac{\sigma}{qV}\right)\sqrt{\left(\frac{p_{even}}{\Gamma_{even}}\right)^2 \sin^2(\theta) + \left(\frac{p_{odd}}{\Gamma_{odd}}\right)^2 \cos^2(\theta)} \qquad (88)$$

where $$R_{odd} = \sin(\theta)qV\Gamma_{odd}. \qquad (89)$$

$$R_{even} = \cos(\theta)qV\Gamma_{even}. \qquad (90)$$

As a consequence of Eq. (87), the mean error $\langle \varepsilon \rangle$ resulting from random intensity noise is zero when $$\frac{\Gamma_{odd}}{p_{odd}} = \frac{\Gamma_{even}}{p_{even}}. \qquad (91)$$

If Eq. (91) is not satisfied, random noise will translate into systematic errors that vary with 2θ. For embodiments featuring a sinusoidal phase shifting algorithm which compensates for the mean error resulting from random additive noise, the selection of the sinusoidal phase shift excursion u and coefficient vectors $h_{odd}, h_{even}$ is subject to the additional constraint imposed by Eq. (91).

Eq. (88) shows that random noise is a first-order contributor (i.e., scales with σ) to the root-mean-square (RMS) phase error, while only contributing at second order to the mean phase error. Thus, although, generally, balancing $\Gamma_{odd}/p_{odd}$ and $\Gamma_{even}/p_{even}$ to reduce or eliminate the mean error is desirable, in some embodiments it is more important to increase $\Gamma_{odd}/p_{odd}$ and $\Gamma_{even}/p_{even}$ to reduce the RMS error while minimizing other sources of systematic error as described further on. However, in embodiments where the random noise σ becomes comparable to the signal level qV, reducing mean error may be the dominant concern. For embodiments featuring a sinusoidal phase shifting algorithm which compensates for the RMS phase error resulting from random additive noise, the selection of the sinusoidal phase shift amplitude u and coefficient vectors $h_{odd}, h_{even}$ is subject to the additional constraint that $\Gamma_{odd}/p_{odd}$ and $\Gamma_{even}/p_{even}$ be made large.

In certain embodiments, the phase shifting algorithm reduces or compensates for the effects of additive synchronous noise. Unlike random noise, noise synchronized to the phase shift cycle can be correlated from data frame to data frame. Examples of synchronous noise include spurious reflections, multiple reflections in a high-Finesse interferometer cavity, and detector noise linked to the frame rate and trigger. A monotone synchronous intensity noise may be modeled as $$n(\nu'', \alpha) = q'' \cos[\nu''(\alpha+\phi)+\xi] \qquad (92)$$

where $\nu''$, $\xi$ are the frequency and phase, respectively, of the noise. Note that the noise phase $\xi$ is referenced to the timing offset $\phi$ and that the amplitude $q'' = \sqrt{2}\sigma$, where σ is the standard deviation of the intensity noise. This noise adds directly to the intensity $\bar{g}(\theta,\alpha)$, creating a phase error ε:

$$\tan(\theta + \varepsilon) = \frac{\Gamma_{even}}{\Gamma_{odd}} \frac{R_{odd}(\theta) + q'' N_{odd}}{R_{even}(\theta) + q'' N_{even}} \qquad (93)$$

where $$N_{odd}(\nu'') = B(\nu'') \sum_j (h_{odd})_j \cos[\nu''(\alpha_j + \varphi) + \xi] \qquad (94)$$

$$N_{even}(\nu'') = B(\nu'') \sum_j (h_{even})_j \cos[\nu''(\alpha_j + \varphi) + \xi]. \qquad (95)$$

In this formalism, unlike that developed for random noise, synchronous noise is a first-order contributor to interferometer error:

$$\tan(\theta + \varepsilon) = \tan(\theta)\left(1 + \frac{q'' N_{odd}(\nu'')}{R_{odd}} - \frac{q'' N_{even}(\nu'')}{R_{even}} + \ldots\right). \qquad (96)$$

Limiting the expansion in terms of ε to first order (ε<<1), the tangent is $$\tan(\theta+\varepsilon) = \tan(\theta) + [1+\tan^2(\theta)]\varepsilon. \qquad (97)$$

Comparing Eq. (96) with Eq. (97) using $$\frac{\tan(\theta)}{1+\tan^2(\theta)} = \sin(\theta)\cos(\theta). \qquad (98)$$

and using Eq. (89) and Eq. (90) for $R_{odd}$, $R_{even}$, respectively shows that to first order $$\varepsilon(\theta) = \frac{q''}{qV}\left[\frac{N_{odd}(\nu'')}{\Gamma_{odd}}\cos(\theta) - \frac{N_{even}(\nu'')}{\Gamma_{even}}\sin(\theta)\right] epted. \qquad (99)$$

Synchronous intensity noise error is cyclic with θ. Averaging the square of the error over a 2π range of θ, the RMS sensitivity to synchronous vibration is $$\sqrt{\langle \varepsilon^2 \rangle_\theta} = \frac{\sigma}{qV}\sqrt{\frac{N_{odd}^2(\nu'')}{\Gamma_{odd}^2} + \frac{N_{even}^2(\nu'')}{\Gamma_{even}^2}} \qquad (100)$$

where $\langle \ldots \rangle_\theta$ means an average over all θ such that $$\langle \cos^2(\theta) \rangle_\theta = \langle \sin^2(\theta) \rangle_\theta = \frac{1}{2}. \qquad (101)$$

For those noise frequencies $\nu''$ that fall exactly at the frequencies $\nu'$ to which $h_{even}$ and $h_{odd}$ are most sensitive, the magnitude of the error is consistent with Eq. (88) for random noise. Eq. (100) reveals that noise sensitivity depends on the specific frequency content of the noise and, given that it is a first-order effect, synchronous intensity noise is a priority consideration. Thus, in embodiments which compensate for synchronous intensity noise with a frequency, $\nu''$, the coefficient vectors are selected subject to the additional constraint that that the sensitivity of these vectors to frequency $\nu''$ should be reduced.

This constraint is equivalent to the requirement that the magnitude of the quantities $$\sum_j (h_{odd})_j \cos[v''(\alpha_j + \varphi)] \quad (102)$$

and $$\sum_j (h_{even})_j \cos[v''(\alpha_j + \varphi)] \quad (103)$$

be made small.

In some embodiments, the phase shifting algorithm reduces or compensates for the effects of multiplicative noise. Multiplicative noise includes unwanted modulations that affect the overall scaling factor q in the interference intensity signal defined in Eq. (8). Examples include source noise and the moving speckle patterns generated by a rotating ground glass when used as a coherence buster synchronized to the camera. Multiplicative noise results in both additive noise from modulating the DC (time independent) portion of the interference signal as well as spurious sidebands to the harmonics in the oscillatory portion of the interference signal. The model interference intensity signal in the presence of monotone multiplicative synchronous noise is $$g(\theta,\alpha,v'') = [q+n(v'',\alpha)]\{1+V\cos[\theta+\phi(\alpha)]\} \quad (104)$$

where just as in Eq. (92), $$n(v'',\alpha) = q'' \cos[v''(\alpha+\phi)+\xi]. \quad (105)$$

Expanding Eq. (104)

$$g(\theta,\alpha,v'') = qD(\theta) + qV\cos(\theta)C(\alpha) + qV\sin(\theta)S(\alpha) + g''(\theta,\alpha,v'') \quad (106)$$

where the additive noise term is $$g''(\theta,v'',\alpha) = D(\theta)n(v'',\alpha) + \ldots + V\cos(\theta)C(\alpha)n(v'',\alpha) + V\sin(\theta)S(\alpha)n(v'',\alpha) \quad (107)$$

When the noise is sampled by the algorithm coefficient vectors $h_{odd}, h_{even}$, the resulting phase error $\epsilon$ is $$\tan(\theta+\varepsilon) = \frac{\Gamma_{even}}{\Gamma_{odd}} \frac{R_{odd}(\theta) + q'' N_{odd}^{mult}(v'', \theta)}{R_{even}(\theta) + q'' N_{even}^{mult}(v'', \theta)} \quad (108)$$

where $$q'' N_{odd}^{mult}(v'', \theta) = \quad (109)$$
$$D(\theta)\sum_j (h_{odd})_j n(v'', \alpha_j) + \ldots + \cos(\theta)V\sum_j (h_{odd})_j C(\alpha_j)n(v'', \alpha_j) +$$
$$\sin(\theta)V\sum_j (h_{odd})_j S(\alpha_j)n(v'', \alpha_j)$$

and similarly for $N_{even}^{mult}$. The products $C(\alpha)n(v'',\alpha)$ and $S(\alpha)n(v'',\alpha)$ generate sidebands at $(v''-v)$ and $(v''+v)$ to the signal harmonic at frequencies $v$:

$$\cos[v''(\alpha+\varphi)+\xi]\cos[v(\alpha+\varphi)] = \quad (110)$$
$$\ldots = \frac{1}{2}\cos[(v''-v)(\alpha+\varphi)+\xi] + \frac{1}{2}\cos[(v''+v)(\alpha+\varphi)+\xi].$$

Consequently, after using Eq. (14) for $D(\theta)$, $$N_{odd}^{mult}(v'', \theta) = N_{odd}(v'') + \quad (111)$$
$$\cos(\theta)[VJ_0(u)N_{odd}(v'') + V\Sigma_2^{odd}(v'')] + \ldots + \sin(\theta)V\Sigma_1^{odd}(v'')$$

$$\Sigma_1^{odd}(v'') = \sum_{v=1,3,5\ldots}^{\infty} (-1)^{(v+1)/2} J_v(u)[N_{odd}(v''-v) + N_{odd}(v''+v)] \quad (112)$$

and $$\Sigma_2^{odd}(v'') = \sum_{v=2,4,6\ldots}^{\infty} (-1)^{v/2} J_v(u)[N_{odd}(v''-v) + N_{odd}(v''+v)], \quad (113)$$

and where, consistent with Eq. (94) for additive intensity noise, $$N_{odd}(v'') = B(v'')\sum_j (h_{odd})_j \cos[v''(\alpha_j + \varphi) + \xi]. \quad (114)$$

There is a similar expression to Eq. (111) for $N_{even}^{mult}(v'',\theta)$. Note the introduction of the integration $B(v'')$ in Eq. (114) to take into account the integrating bucket effect of the data acquisition. The phase error is $$\varepsilon(\theta) = \frac{q''}{qV}\left[\frac{N_{odd}^{mult}(v'', \theta)}{\Gamma_{odd}}\cos(\theta) - \frac{N_{even}^{mult}(v'', \theta)}{\Gamma_{even}}\sin(\theta)\right]. \quad (115)$$

Expanding Eq. (115) using Eq. (111) and a similar equation for $N_{even}^{mult}(v'',\theta)$, $$\varepsilon(\theta) = \frac{q''}{qV\Gamma_{odd}}[N_{odd}\cos(\theta) + \cos^2(\theta)(VJ_0 N_{odd} + V\Sigma_2^{odd}) + \quad (116)$$
$$\ldots + \sin(\theta)\cos(\theta)V\Sigma_1^{odd}] - \ldots - \frac{q''}{qV\Gamma_{even}}[N_{even}\sin(\theta) +$$
$$\sin(\theta)\cos(\theta)(VJ_0 N_{even} + V\Sigma_2^{even}) + \ldots + \sin^2(\theta)V\Sigma_1^{even}]$$

where the u and v'' dependencies have been omitted for compactness. The phase error $\epsilon$ is cyclic, but contains components varying at both $\theta$ and $2\theta$. The $\theta$-dependent portion is the additive noise generated by modulating the DC, while the $2\theta$-dependent portion results from the sidebands to the harmonics. Because of the $\theta$-independent factors in Eq. (116), the mean value $\langle\epsilon\rangle_\theta$ of the phase error is nonzero, which is to say, that multiplicative noise introduces offset errors to $\theta$ that do not vary with $\theta$. Taking the averaged over all $\theta$, the mean value of the phase error for multiplicative intensity noise simplifies to $$\langle\varepsilon\rangle_\theta = \frac{q''}{q}\left(\frac{J_0 N_{odd}}{\Gamma_{odd}} - \frac{\Sigma_1^{even}}{\Gamma_{even}} + \frac{\Sigma_2^{odd}}{\Gamma_{odd}}\right) \quad (117)$$

In embodiments where, for example, the surface profile of a measurement object is determined, this $\theta$-independent offset, $\langle\epsilon\rangle_\theta$, corresponds to an overall piston term that normally is subtracted from the profile.

The square of the error averaged is $$\varepsilon^2(\theta) = \left[\frac{q'' N_{odd}^{mult}(\theta)\cos(\theta)}{qV\Gamma_{odd}}\right]^2 + \left[\frac{q'' N_{even}^{mult}(\theta)\sin(\theta)}{qV\Gamma_{even}}\right]^2 - \ldots - 2\frac{q''^2 N_{odd}^{mult}(\theta) N_{even}^{mult}(\theta)}{qV\Gamma_{even}}\sin(\theta)\cos(\theta). \quad (118)$$

Averaging over a $2\pi$ cycle of $2\theta$ gives $$\frac{\langle\varepsilon^2\rangle_\theta}{(\sigma/q)^2} = \frac{4N_{odd}^2/V^2 + (\Sigma_1^{odd})_2 + 3(J_0 N_{odd} + \Sigma_2^{odd})^2}{4\Gamma_{odd}^2} + \ldots + \frac{4N_{even}^2/V^2 + 3(\Sigma_1^{even})_2 + (J_0 N_{even} + \Sigma_2^{even})^2}{4\Gamma_{even}^2} - \ldots - \frac{\Sigma_1^{odd}(J_0 N_{even} + \Sigma_2^{even}) + \Sigma_1^{even}(J_0 N_{odd} + \Sigma_2^{odd})}{2\Gamma_{odd}\Gamma_{even}} \quad (119)$$

where $$\sigma = q''/\sqrt{2}. \quad (120)$$

The standard deviation of the phase error is $$\epsilon_{stdv}(v'',\xi) = \sqrt{\langle\varepsilon^2\rangle_\theta - \langle\varepsilon\rangle_\theta^2}. \quad (121)$$

This expression describes the magnitude of the ripple or print-through error resulting from multiplicative synchronous intensity noise.

For a given choice of coefficient vectors, Eq. (121) gives frequency dependence of the sensitivity of the algorithm to multiplicative synchronous noise. Based on this result, coefficient vectors are selected which result in an algorithm that is insensitive to noise at a given set of frequencies. For embodiments featuring sinusoidal phase shifting algorithms which compensate multiplicative synchronous noise at a specific frequency, coefficient vectors are selected subject to the additional constraint that the sensitivity of the algorithm to noise at that frequency, as determined using Eq. (121), is made small.

Figure 9A:
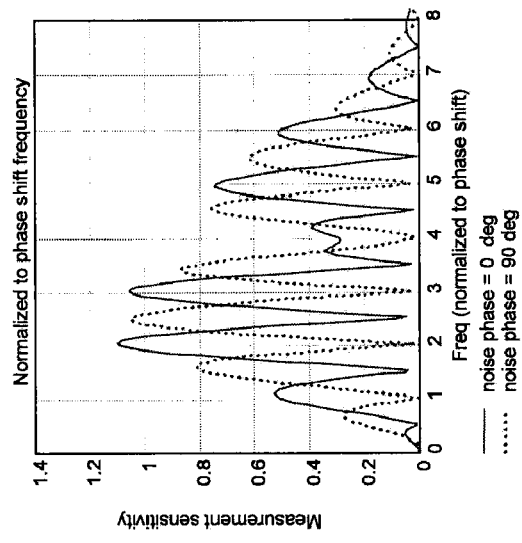
FIG. 9a is a plot of the measurement sensitivity to multiplicative synchronous noise versus noise frequency for an eight sample position algorithm.
Figure 9B:
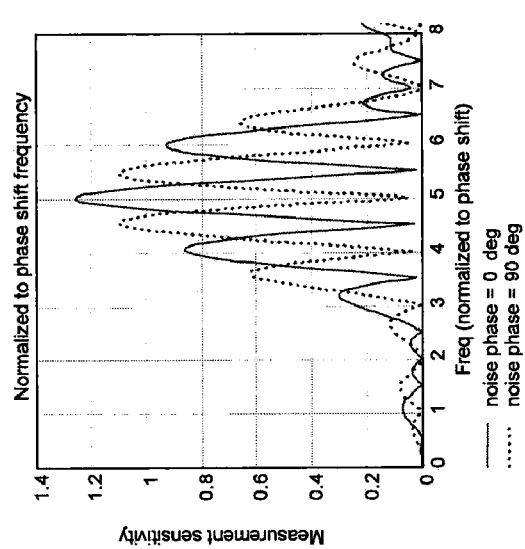
FIG. 9b is a plot of the measurement sensitivity to multiplicative synchronous noise versus noise frequency for a sixteen position algorithm.

For example, FIGS. 9a and 9b show the multiplicative noise sensitivity of the eight frame and sixteen frame algorithms described in the examples above. The eight frame algorithm is highly sensitive to noise at frequencies below 3.5f, where f is the sinusoidal phase shift frequency, but only moderately sensitive to noise at frequencies about equal to 4f. The sixteen frame algorithm, on the other hand is relatively insensitive to frequencies below 3.5f, but highly sensitive to noise at about 4f. Therefore, the sixteen frame algorithm compensates well for multiplicative synchronous noise at frequencies below 3.5f, but poorly for noise at noise at frequencies around 4f. The sixteen frame algorithm compensates well for multiplicative synchronous noise at frequencies around 4f, but poorly for noise at frequencies below 3.5f. Using Eq. (121) to find suitable choices of coefficient vectors, additional algorithms may be provided with which compensate for noise at other frequency ranges.

In another example, in embodiments employing wavelength shifting sinusoidal PSI, the wavelength shift is generated by modulating the current provided to a laser diode. The wavelength shift is caused by the change in temperature of the active region of the diode with current, which causes the active region to change in length. A corresponding intensity modulation follows the current-induced frequency shift. The intensity noise generated by current tuning is multiplicative synchronous noise in the form of a sinusoid at the same frequency and phase as the sinusoidal phase shift pattern itself. Thus resulting standard deviation of the phase error is given by Eq. (121), with v''=1, $\xi$=0. Inspection of Eqs. (117) through (121) shows that $\epsilon_{stdv}(1,0)$ is non-zero only for algorithms with coefficient vectors sensitive to the first harmonic of the sinusoidal phase shift frequency. Thus, in embodiments featuring algorithms which compensate for laser diode intensity noise, the coefficient vectors are selected subject to the additional constraint that that the sensitivity of these vectors at the first harmonic should be minimized. This is constraint is equivalent to the requirement that the magnitude of the quantities $$\sum_j (h_{odd})_j \cos[(\alpha_j + \varphi)] \quad (122)$$

and $$\sum_j (h_{even})_j \cos[(\alpha_j + \varphi)] \quad (123)$$

be minimized.

For example, referring to FIG. 9b, the sixteen frame algorithm is relatively insensitive to noise at the sinusoidal phase shift frequency, and so could well compensate laser diode intensity noise. However, more complete compensation could be achieved by choosing a coefficient vector totally insensitive to the first harmonic.

In certain embodiments, the phase shifting algorithm compensates for synchronous vibration noise. In typical PSI applications, vibration (e.g. vibration from the environment in which the PSI system is located) is often difficult to control. The vibrations correspond to phase noise, which, for small vibrations, translates into an additive intensity noise that contains sidebands to the harmonics produced by the sinusoidal phase shift. The model interference intensity signal in the presence of monotone synchronous vibration noise is $$g(\theta,\alpha,v'') = q\{1 + V\cos[\alpha + n(\alpha,v'') + \phi(\alpha)]\} \quad (124)$$

for $$n(\alpha,v'') = u''\cos[v''(\alpha+\phi)+\xi] \quad (125)$$

where u'', v'', $\xi$ are the amplitude, frequency and phase, respectively, of the phase noise generated by vibrations. In typical embodiments, u''<<1 so that, $$\cos[\theta + n(v'',\alpha)] \approx \cos(\theta) - \sin(\theta)n(\alpha,v'') \quad (126)$$

$$\sin[\theta + n(v'',\alpha)] \approx \sin(\theta) + \cos(\theta)n(\alpha,v'') \quad (127)$$

and $$g(\theta,v'',\alpha) = [qD(\theta) + qV\cos(\theta)C(\alpha) + qV\sin(\theta)S(\alpha)] + g''(\theta,v'',\alpha) \quad (128)$$

where the intensity noise resulting from the vibration is $$g''(\theta,v'',\alpha) = qVJ_0(u)\sin(\theta)n(v'',\alpha) - \ldots - qV\sin(\theta)C(\alpha)n(v'',\alpha) + qV\cos(\theta)S(\alpha)n(v'',\alpha) \quad (129)$$

When the vibrational noise is sampled by the algorithm coefficient vectors $h_{odd}, h_{even}$, the resulting noise terms are $$\frac{u'' N_{odd}^{vib}(v'', \theta)}{qV} = -J_0(u)\sin(\theta)\sum_j (h_{odd})_j n(v'', \alpha_j) - \ldots - \quad (130)$$

$$\sin(\theta)\sum_j (h_{odd})_j n(v'', \alpha_j)C(\alpha_j) + \cos(\theta)\sum_j (h_{odd})_j n(v'', \alpha_j)S(\alpha_j).$$

and similarly for $N_{even}^{vib}(v'',\theta)$. Expanding the cosine terms gives $$\frac{N_{odd}^{vib}(v'', \theta)}{qV} = \cos(\theta)\Sigma_1^{odd}(v'') - \sin(\theta)[J_0(u)N_{odd}(v'') + \Sigma_2^{odd}(v'')] \quad (131)$$

where $\Sigma_1^{odd}(v'')$, $\Sigma_2^{odd}(v'')$ are as in Eq. (112) and Eq. (113). The phase error $\epsilon$ reads $$\varepsilon(\theta) = u''\left[\frac{N_{odd}^{vib}(v'', \theta)}{qV\Gamma_{odd}}\cos(\theta) - \frac{N_{even}^{vib}(v'', \theta)}{qV\Gamma_{even}}\sin(\theta)\right]. \quad (132)$$

Expanding Eq. (132) using Eq. (131) and a similar equation for $N_{even}^{vib}(v'',\theta)$, $$\varepsilon(\theta) = \frac{u''}{\Gamma_{odd}}[\cos^2(\theta)\Sigma_1^{odd} - \sin(\theta)\cos(\theta)(J_0 N_{odd} + \Sigma_2^{odd})] - \quad (133)$$

$$\ldots - \frac{u''}{\Gamma_{even}}[\sin(\theta)\cos(\theta)\Sigma_1^{even} - \sin^2(\theta)(J_0 N_{even} + \Sigma_2^{even})]$$

where the u and v" dependencies have been omitted for compactness. The θ dependence comes in as products of sines and cosines. Consequently, the phase error $\epsilon$ is cyclic with θ at the rate 2θ. Unlike multiplicative synchronous noise, there is no error component for vibrational noise that is cyclic at the same rate as θ. There is however a nonzero mean value $\langle\epsilon\rangle_\theta$ of the phase error. Averaging over θ, $$\langle\varepsilon\rangle_\theta = \frac{u''}{2}\left(\frac{J_0 N_{even}}{\Gamma_{even}} + \frac{\Sigma_1^{odd}}{\Gamma_{odd}} + \frac{\Sigma_2^{even}}{\Gamma_{even}}\right). \quad (134)$$

In embodiments where, for example, the surface profile of a measurement object is determined, this θ-independent offset $\langle\epsilon\rangle_\theta$ corresponds to an overall piston term that normally is subtracted from the profile.

The square of the error is $$\varepsilon = \left[\frac{u'' N_{odd}^{vib}(\theta)\cos(\theta)}{qV\Gamma_{odd}}\right]^2 + \left[\frac{u'' N_{even}^{vib}(\theta)\sin(\theta)}{qV\Gamma_{even}}\right]^2 - \quad (135)$$

$$\ldots - \frac{u''^2 N_{odd}^{vib}(\theta) N_{even}^{vib}(\theta)}{qV\Gamma_{even}}\sin(\theta)\cos(\theta).$$

The terms are $$\frac{[N_{odd}^{vib}(\theta)\cos(\theta)]^2}{(qV)^2} = \sin^2(\theta)\cos^2(\theta)[J_0 N_{odd} + \Sigma_2^{odd}]^2 + \quad (136)$$

$$\cos^4(\theta)(\Sigma_1^{odd})^2 - \ldots - 2\sin(\theta)\cos^3(\theta)[\Sigma_1^{odd} J_0 N_{odd} + \Sigma_1^{odd}\Sigma_2^{odd}]$$

$$\frac{[N_{even}^{vib}\sin(\theta)]^2}{(qV)^2} = \sin^4(\theta)(J_0 N_{even} + \Sigma_2^{even})^2 + \sin^2(\theta)\cos^2(\theta)(\Sigma_1^{even})^2 - \quad (137)$$

$$\ldots - 2\sin^3(\theta)\cos(\theta)(\Sigma_1^{even} J_0 N_{even} + \Sigma_1^{even}\Sigma_2^{even})$$

$$\frac{N_{even}^{vib} N_{odd}^{vib}\cos(\theta)\sin(\theta)}{(qV)^2} = +\sin(\theta)\cos^3(\theta)\Sigma_1^{odd}\Sigma_1^{even} + \ldots + \quad (138)$$

$$\sin^3(\theta)\cos(\theta)(J_0 N_{odd} + \Sigma_2^{odd})(J_0 N_{even} + \Sigma_2^{even}) + \ldots - $$

$$\sin^2(\theta)\cos^2(\theta)[\Sigma_1^{odd}(J_0 N_{even} + \Sigma_2^{even}) + \Sigma_1^{even}(J_0 N_{odd} + \Sigma_2^{odd})].$$

The terms simplify to $$\frac{\langle[N_{odd}^{vib}\cos(\theta)]^2\rangle}{(qV)^2} = \frac{1}{8}(J_0 N_{odd} + \Sigma_2^{odd})^2 + \frac{3}{8}(\Sigma_1^{odd})^2 \quad (139)$$

$$\frac{\langle[N_{even}^{vib}\sin(\theta)]^2\rangle}{(qV)^2} = \frac{3}{8}(J_0 N_{even} + \Sigma_2^{even})^2 + \frac{1}{8}(\Sigma_1^{even}) \quad (140)$$

$$\frac{\langle N_{even}^{vib} N_{odd}^{vib}\cos(\theta)\sin(\theta)\rangle}{(qV)^2} = \ldots = \frac{1}{8}\left[\begin{array}{c}\Sigma_1^{odd}(J_0 N_{even} + \Sigma_2^{even}) + \\ \Sigma_1^{even}(J_0 N_{odd} + \Sigma_2^{odd})\end{array}\right]. \quad (141)$$

Introducing these results into Eq. (135), $$\frac{\langle\varepsilon^2\rangle_\theta}{\sigma^2} = \quad (142)$$

$$\frac{(J_0 N_{odd} + \Sigma_2^{odd})^2 + 3(\Sigma_1^{odd})^2}{4\Gamma_{odd}^2} + \frac{3(J_0 N_{even} + \Sigma_2^{even})^2 + (\Sigma_1^{even})^2}{4\Gamma_{even}^2} +$$

$$\ldots + \frac{\Sigma_1^{odd}(J_0 N_{even} + \Sigma_2^{even}) + \Sigma_1^{even}(J_0 N_{odd} + \Sigma_2^{odd})}{2\Gamma_{odd}\Gamma_{even}}.$$

The standard deviation of the phase error is $$\epsilon_{stdv} = \sqrt{\langle\varepsilon^2\rangle_\theta - \langle\varepsilon\rangle_\theta^2}. \quad (143)$$

For a given choice of coefficient vectors, Eq. (143) gives frequency dependence of the sensitivity of the algorithm to synchronous vibration noise. Knowledge of this dependence allows for the selection of coefficient vectors resulting in an algorithm which is insensitive to vibrations at a given set of frequencies. Thus, for embodiments featuring algorithms which compensate synchronous vibration noise at a specific frequency, the coefficient vectors are selected subject to the additional constraint that the sensitivity of the algorithm to noise at that frequency, as determined by Eq. (143), is made small.

Figure 10A:
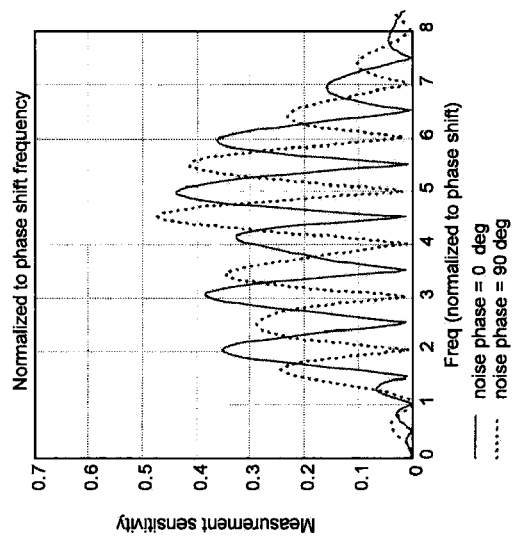
FIG. 10a is a plot of the measurement sensitivity to synchronous vibration noise versus noise frequency for an eight sample position algorithm.
Figure 10B:
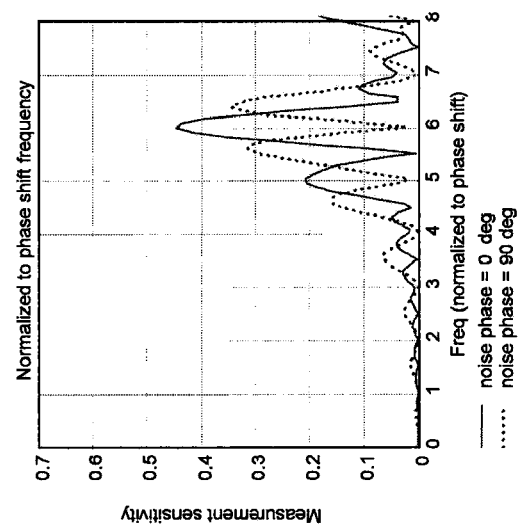
FIG. 10b is a plot of the measurement sensitivity to multiplicative synchronous noise for versus noise frequency for a sixteen sample position algorithm.

For example, in many sinusoidal PSI applications, the intensity of vibrations scales as the inverse of their frequencies. It is therefore desirable to employ algorithms which compensate for synchronous vibration noise at low frequencies. FIGS. 10a and 10b show the synchronous vibration noise sensitivity of the eight frame and sixteen frame algorithms described in the examples above. The eight frame algorithm is highly sensitive to noise at frequencies above the sinusoidal phase shift frequency, and therefore does not compensate well for errors caused by low frequency vibrations. The sixteen frame algorithm, on the other hand, is relatively insensitive to noise at frequencies below four times the sinusoidal phase shift frequency, and therefore does not compensate well for errors caused by low frequency vibrations. In other embodiments, using Eq. (143), alternative coefficient vectors are selected to provide algorithms which compensate for noise at other frequency ranges.

Figure 11A:
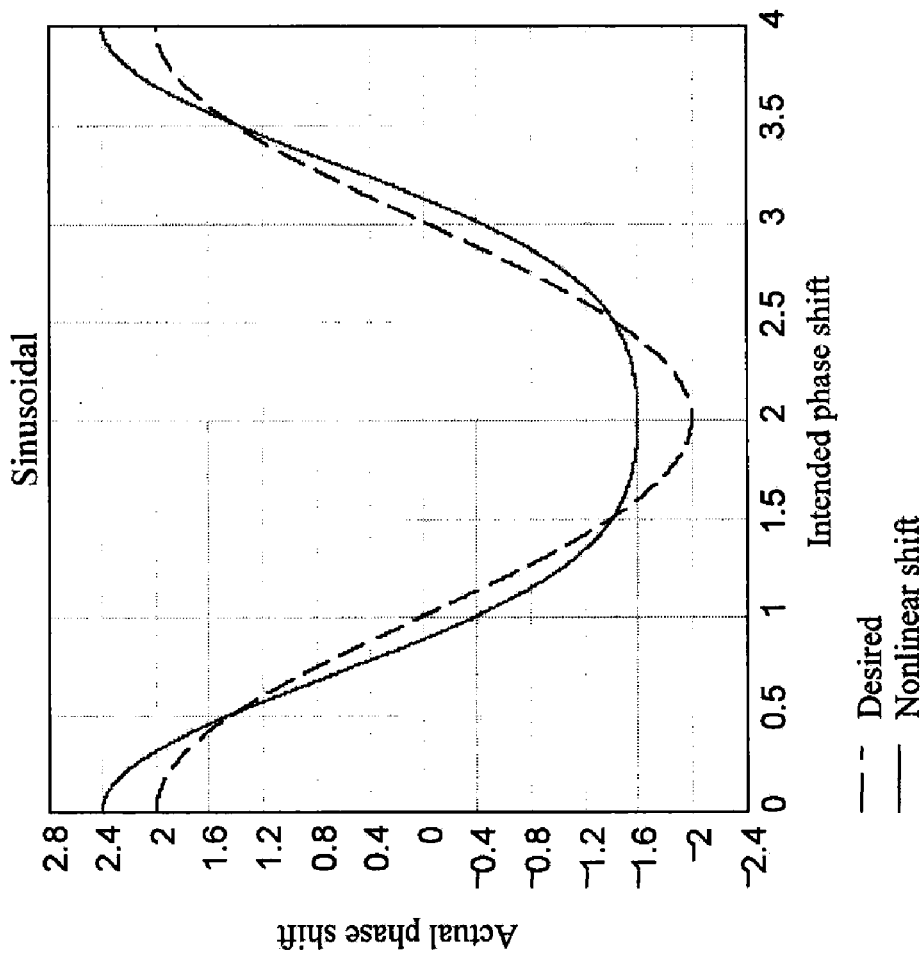
FIG. 11a shows a plot of a sinusoidal phase shift with a quadratic nonlinearity.
Figure 11B:
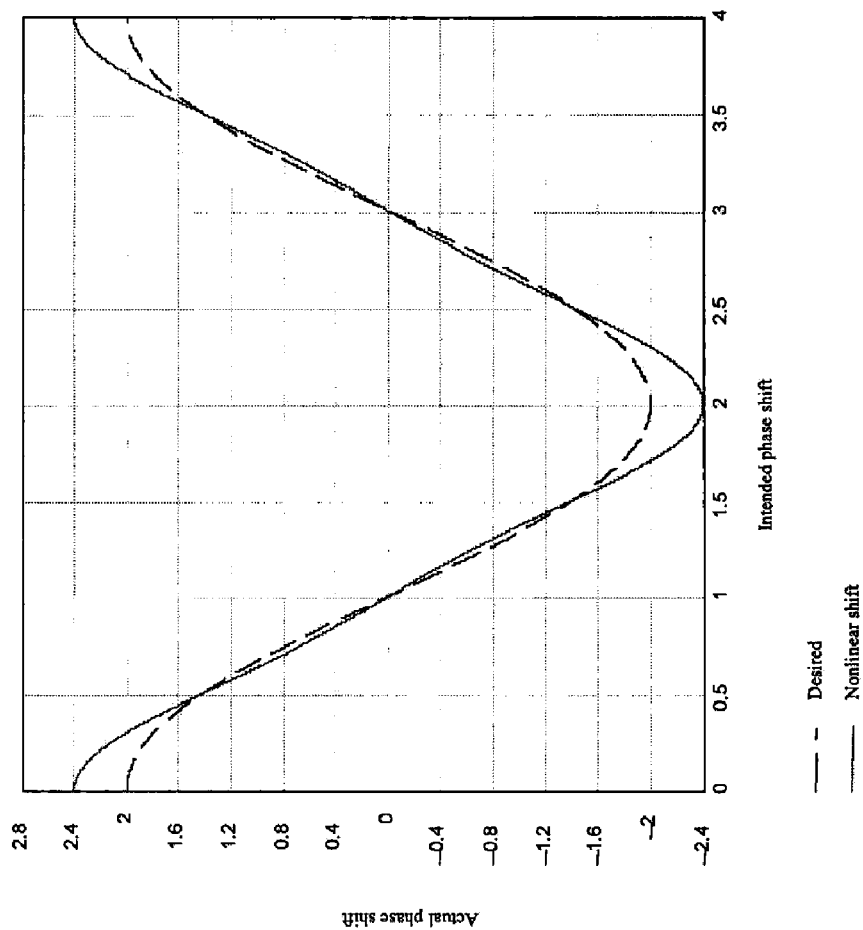
FIG. 11b shows a plot of a sinusoidal phase shift with a third-order nonlinearity.

In further embodiments, the phase shifting algorithm reduces or compensates for the effects of phase shift nonlinearity. In some embodiments, the sinusoidal phase shift deviates from a pure sinusoid due to imperfections in the phase shifting mechanism. For example, in embodiments where the phase shift is provided by wavelength tuning a laser diode, the response of laser diodes may suffer from imperfections. In embodiments where the phase shift is provided by a PZT scanner, then scanner can have nonlinear response, particularly when heavily loaded and/or driven at high speed. Common imperfections include quadratic and cubic nonlinearities in the sinusoidal phase shift, as illustrated in FIGS. 11a and 11b respectively.

A quadratic nonlinearity in the sinusoidal phase shift can be defined as $$\phi'' = u\zeta\left[\left(\frac{\phi - \langle\phi\rangle}{u}\right)^2 - \frac{1}{2}\right] \quad (144)$$

where $\phi$ is the intended phase shift, $\langle\phi\rangle$ is its average value, and the coefficient $\zeta$ is the peak-valley deviation from linear normalized to the intended phase shift excursion u. Thus if the phase shift excursion u=2 and the coefficient $\zeta$=40%, then the peak-valley nonlinearity is 0.8 over a total phase shift amplitude of 2u=4.

The nonlinearity reduces to a phase error at twice the sinusoidal phase shift frequency:

$$\phi'' = u\zeta\left[\cos^2[\alpha(t) + \varphi] - \frac{1}{2}\right], \quad (145)$$

$$\phi'' = \frac{u\zeta}{2}\cos[2(\alpha + \varphi)]. \quad (146)$$

This phase error is equivalent to a vibration of phase amplitude u''=u$\zeta$/2 and phase $\xi$=0 at a normalized frequency v''=2. Assuming that the nonlinearity is small, Eq. (133) applies for the resulting phase error $\epsilon(\theta)$ and Eq. (143) is the resulting standard deviation. The phase error attributable to quadratic nonlinearity is cyclic at the rate 2θ and the standard deviation scales linearly with the coefficient u$\zeta$/(2√2) at a rate determined by the vibration sensitivity of a candidate algorithm. Defining Eq. (143) normalized to σ as Ω (v''=2), the standard deviation for quadratic nonlinearities in sinusoidal PSI is:

$$\varepsilon_{stdv} = \zeta\frac{u}{2\sqrt{2}}\Omega(v'' = 2) \quad (147)$$

In embodiments featuring algorithms which compensate for quadratic nonlinearity, the coefficient vectors are selected subject to the additional constraint that that the frequency sensitivity of these vectors at twice the sinusoidal phase shift frequency be made small. This is constraint is equivalent to the requirement that the magnitude of the quantities $$\sum_j (h_{odd})_j \cos[2(\alpha_j + \varphi)] \quad (148)$$

and $$\sum_j (h_{even})_j \cos[2(\alpha_j + \varphi)] \quad (149)$$

be made small.

Higher order nonlinearities may be defined by $$\phi'' = u\zeta\left[\left(\frac{\phi - \langle\phi\rangle}{u}\right)^2 - \frac{1}{2}\right]\left(\frac{\phi - \langle\phi\rangle}{u}\right)^{(n-2)} \quad (150)$$

where n≥2 is the order of the nonlinearity. For algorithms where $\langle\phi\rangle$=0

$$\phi'' = \frac{u\zeta}{2}\cos[2(\alpha + \varphi)][\cos(\alpha + \varphi)]^{(n-2)} \quad (151)$$

which for orders n=3, 4, 5 respectively is $$\phi'' = \frac{u\zeta}{4}\{\cos(\alpha + \varphi) + \cos[3(\alpha + \varphi)]\} \quad (152)$$

$$\phi'' = \frac{u\zeta}{8}\{1 + 2\cos[2(\alpha + \phi)] + \cos[4(\alpha + \phi)]\} \quad (153)$$

$$\phi'' = \frac{u\zeta}{16}\{4\cos(\alpha + \varphi) + 3\cos[3(\alpha + \varphi)] + \cos[5(\alpha + \varphi)]\}. \quad (154)$$

The resulting θ-dependent phase errors for orders n=3, 4, 5 readily follow as $$\varepsilon(\theta) = \zeta\frac{u}{4}[\Psi(\theta, v'' = 1) + \Psi(\theta, v'' = 3)] \quad (155)$$

$$\varepsilon(\theta) = \zeta\frac{u}{8}[1 + 2\Psi(\theta, v'' = 2) + \Psi(\theta, v'' = 4)] \quad (156)$$

$$\varepsilon(\theta) = \zeta\frac{u}{16}[4\Psi(\theta, v'' = 1) + 2\Psi(\theta, v'' = 3) + \Psi(\theta, v'' = 5)]. \quad (157)$$

where $\Psi(\theta,v'')$ is the θ- and v'' dependent vibrational phase errors calculated from Eq. (133). From the above it is straightforward to analytically or numerically derive the resultant standard deviation of the phase error. As the order of the nonlinearity increases, so does the number of frequency components present in the resultant phase shift error. Thus, in embodiments featuring algorithms which compensate for higher order nonlinearity, the coefficient vectors are selected subject to the additional constraint that that the sensitivity of algorithm at these frequencies, as calculated using the approach outline above, should be minimized.

In some embodiments, the phase shifting algorithm reduces or compensates for the effect of variations of the sinusoidal phase shift excursion from a nominal value. In many applications, such compensations is critical because changes in the phase shift excursion u change the relative strengths of the frequency components in the interferometer signal, which leads to errors in sinusoidal PSI. In some applications, such variations are inevitable. For example, as described in R. C. Moore and F. H. Slaymaker, "Direct measurement of phase in a spherical-wave Fizeau interferometer," Appl. Opt. 19(13), 2196-2200 (1980), in sinusoidal PSI systems featuring a high-NA spherical Fizeau cavity with a mechanical phase shifting mechanism, the phase shift excursion varies as a function of angle, and thus varies from the nominal value. In other cases, uncertainty in the calibration of the excursion is difficult to reduce.

Defining $\epsilon$ as the phase error resulting from a calibration error δu relative to the true value u of the phase shift excursion, $$\tan(\theta + \varepsilon) = \frac{\Gamma_{odd}(u + \delta u)\Gamma_{even}(u)}{\Gamma_{even}(u + \delta u)\Gamma_{odd}(u)}\tan(\theta). \quad (158)$$

As in Eq. (97) the expansion to first order in $\varepsilon$ is $$\tan(\theta+\varepsilon)=\tan(\theta)+[1+\tan^2(\theta)]\varepsilon. \quad (159)$$

Equating Eq. (158) and Eq. (159) and using Eq. (98)

$$\varepsilon = \frac{1}{2}(\rho - 1)\sin(2\theta) \quad (160)$$

where $$\rho = \frac{\Gamma_{even}(u + \delta u)\Gamma_{odd}(u)}{\Gamma_{odd}(u + \delta u)\Gamma_{even}(u)}. \quad (161)$$

Eq. (160) shows that the error is cyclic with period $2\theta$.

In embodiments featuring an algorithm which compensate for variations in the sinusoidal phase shift amplitude, coefficient vectors are selected subject to the additional constraint that the value $\rho$ approach unity.

For example, in the sixteen frame algorithm described in the examples above, the constrains imposed by Eq. (60) and Eq. (61) requiring that $\rho$ deviate from unity only by terms second order or greater in $\delta u$. Thus the sixteen frame algorithm can compensates well for variations in the sinusoidal phase shift amplitude.

In certain embodiments, the phase shifting algorithm compensates for variations of the timing offset $\phi$ from a nominal value. In the algorithms designed to operate at a fixed nominal value of the timing offset $\phi$, any deviation $\delta\phi$ of the timing offset from the nominal value can lead to phase measurement errors. Deviations $\delta\phi$ are attributable, e.g., to timing uncertainty in the synchronization of the phase shift with respect to the data acquisition. Assuming that a timing offset error does not alter basic properties of the algorithm such as insensitivity of the odd coefficient vector to even harmonics, the effect of a timing error is similar to a phase shift amplitude calibration error analyzed above. The phase error is $$\varepsilon = \frac{1}{2}(\rho - 1)\sin(2\theta), \quad (162)$$

where $$\rho = \frac{\Gamma_{even}(\varphi + \delta\varphi)\Gamma_{odd}(\varphi)}{\Gamma_{odd}(\varphi + \delta\varphi)\Gamma_{even}(\varphi)}. \quad (163)$$

In Eq. (163), $\phi$ is the nominal or correct timing offset, $\delta\phi$ is the error in $\phi$ and $\Gamma_{odd}$, $\Gamma_{even}$ follow from Eq. (39) and (40). Expansion of the quantity $\rho$ in orders of $\delta\phi$ shows that terms below second order vanish for a nominal values $\phi=0$ or $\phi=\pi$. In embodiments featuring an algorithm which compensate for variations in timing the nominal value of the timing offset is set close to $\phi=0$ or $\phi=\pi$.

For example, the algorithms described above are based on synchronous detection of the cosine according to Eq. (25), Eq. (32) and Eq. (33) and have at most a second order dependence on the precise value of $\phi$.

Figure 12:
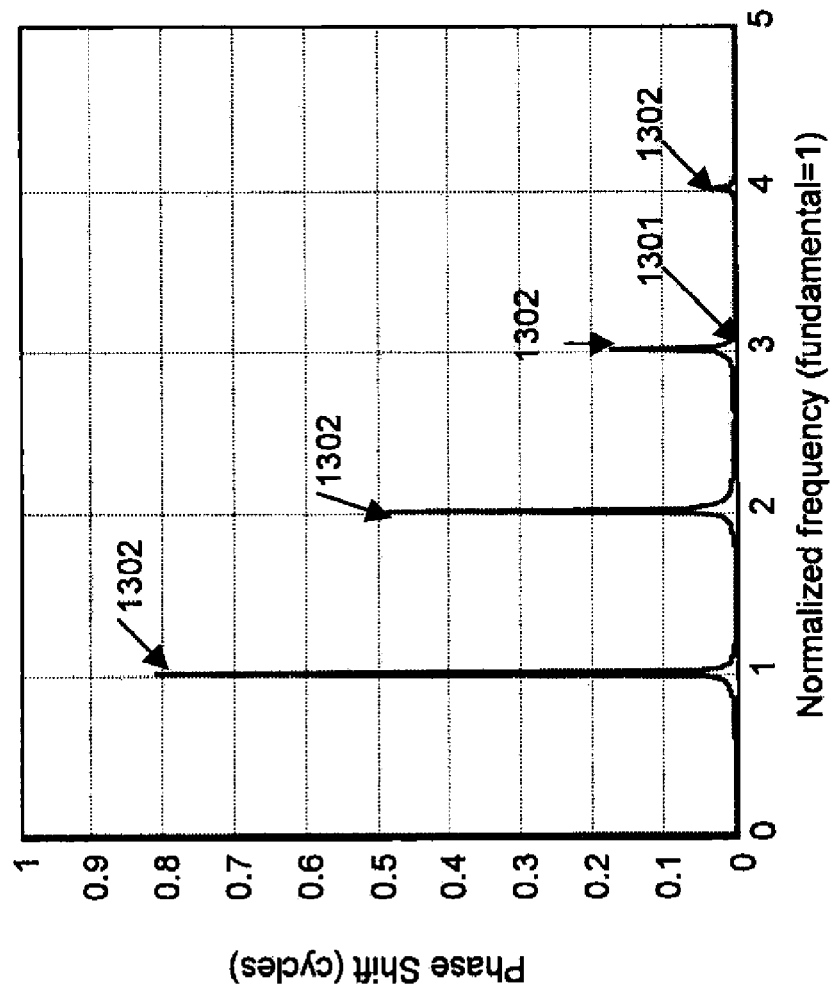
FIG. 12 is a plot of the magnitude of the Fourier Transform of an interference signal.

In some embodiments embodiment, controller 60 transforms the interference signal from the time domain to the frequency domain using, for example, a complete complex valued Fourier Transform. FIG. 12 shows the magnitude of the digital fast Fourier Transform 1301 of a simulated sinusoidal phase shift signal. The frequency domain representation 1301 in FIG. 12 shows the anticipated sequence of frequency components 1302 at harmonics of the of the sinusoidal phase shift frequency. As in the analysis above, the ratio of the even harmonics to the odd harmonics provides a measure of $\theta$. For example, if identifying the fundamental and second harmonics in FIG. 12 and measuring their magnitudes, in the first quadrant of $\theta$ (i.e., modulo $\pi/2$)

$$\tan(\theta) = \frac{\Gamma_{odd}^{FT}}{\Gamma_{even}^{FT}}\frac{|G(\theta,1)|}{|G(\theta,2)|} \quad (164)$$

where $|G(\theta,v)|$ is the magnitude of the transformed interference signal at the $v^{th}$ harmonic of the sinusoidal phase shift frequency, and the normalization coefficients, determined from the theoretical signal Eq. (19) are $$\Gamma^{FT}_{odd}=-2J_1(u)B(1) \quad (165)$$

$$\Gamma^{FT}_{even}=-2J_2(u)B(2). \quad (166)$$

To cover the full $2\pi$ range of $\theta$, controller 60 further analyzes the Fourier Transform to first solve for $\phi$ and then determine the appropriate quadrant. In various embodiments, one or more of the error compensating techniques discussed above is applied to the calculation of the phase difference $\theta$. For example, in some embodiments where low frequency vibration noise is an issue, Eq. (164) is replaced with an equivalent expression comparing frequency components at higher order harmonics of the sinusoidal phase shift frequency.

Additionally, in some embodiments, controller 60 analyzes the detailed Fourier Transform to determine information not only about the phase $\theta$ but also about the timing offset $\phi$ and the excursion u. This technique can compensate for unknown or uncertain values of the parameters $\phi$,u.

Figure 13:
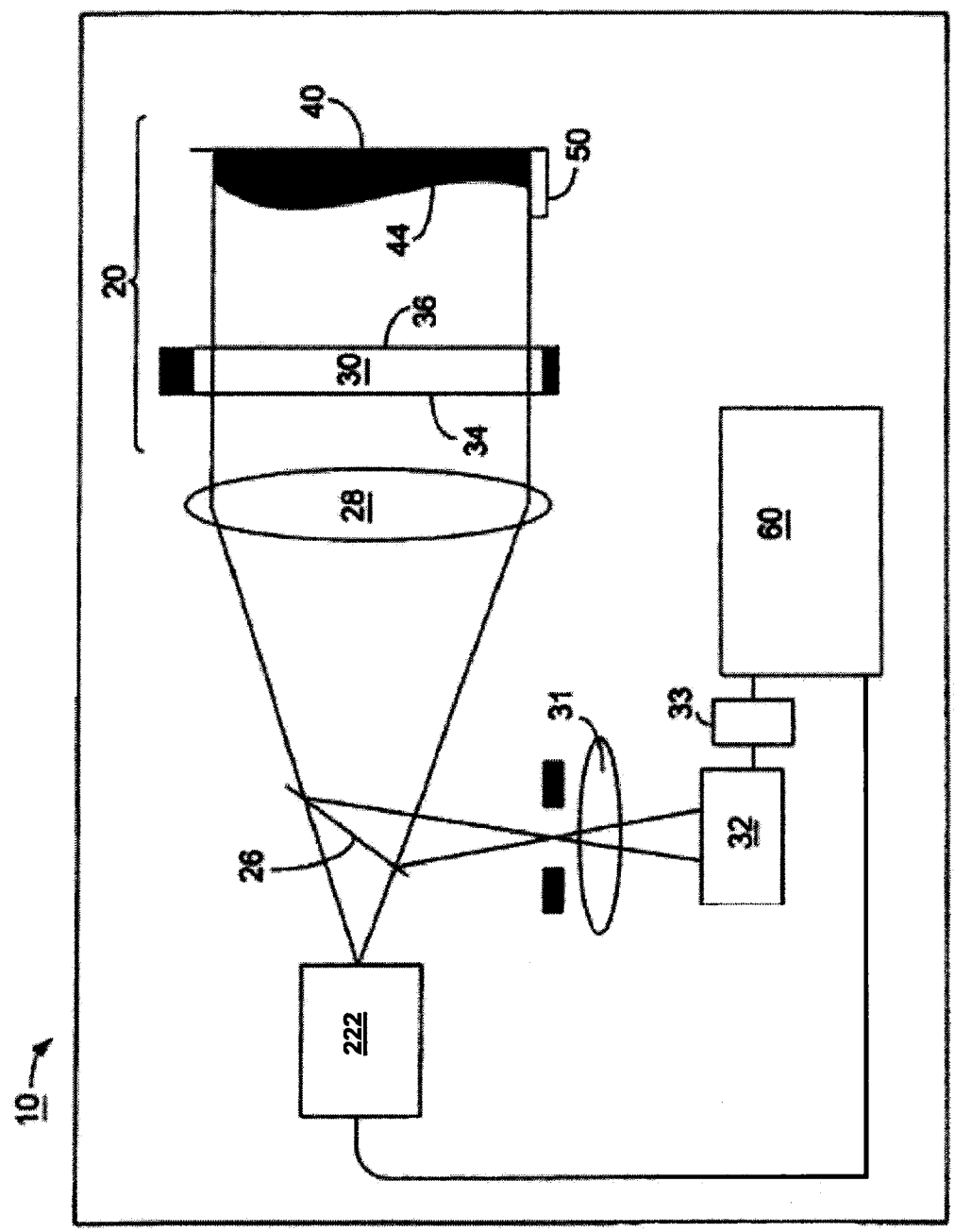
FIG. 13 is a schematic diagram of a sinusoidal phase-shifting interferometer system with wavelength tuned phase shifting.

FIG. 13 shows schematic diagram of a sinusoidal phase-shifting interferometric system 10 featuring a wavelength tunable light source 222 (e.g., a tunable diode laser. As shown, the interferometer uses a Fizeau geometry similar to that described in the embodiment shown in FIG. 1. However, the position of the reference object 30 is not modulated. Instead, the tunable light source is driven by controller 60, to provide light of sinusoidally varying wavelength. In this fashion, a sinusoidal phase shift is introduced between the reference and measurement light, where the sinusoidal phase shift frequency depends of the frequency at which the wavelength of the laser source varied, as described below.

In the Fizeau geometry, the reference and measurement light travel unequal optical path lengths. In general, in unequal path interferometers, the phase difference between the reference and measurement light depends on both the optical path difference, and the wavelength of the light. Thus, varying the wavelength of the light in time shifts relative phase between the reference and measurement light at a phase shift frequency which depends on both the rate at which the wavelength is varied and the optical path length difference between the reference and measurement light paths. Note that although a Fizeau interferometer is shown, any unequal path length interferometer may be used. Phase-shifting interferometry based on such wavelength tuning is described in, for example, U.S. Pat. No. 6,359,692 entitled "METHOD AND SYSTEM FOR PROFILING OBJECTS HAVING MULTIPLE REFLECTIVE SURFACES USING WAVELENGTH-TUNING PHASE-SHIFTING INTERFEROMETRY" by Peter de Groot, the contents of which are incorporated herein by reference.

Controller 60 drives light source 222 so as to vary the wavelength sinusoidally in time thereby providing a sinusoidal phase shift. The controller 60 stores and analyzes the recorded interference signal using the techniques described above.

Figure 14:
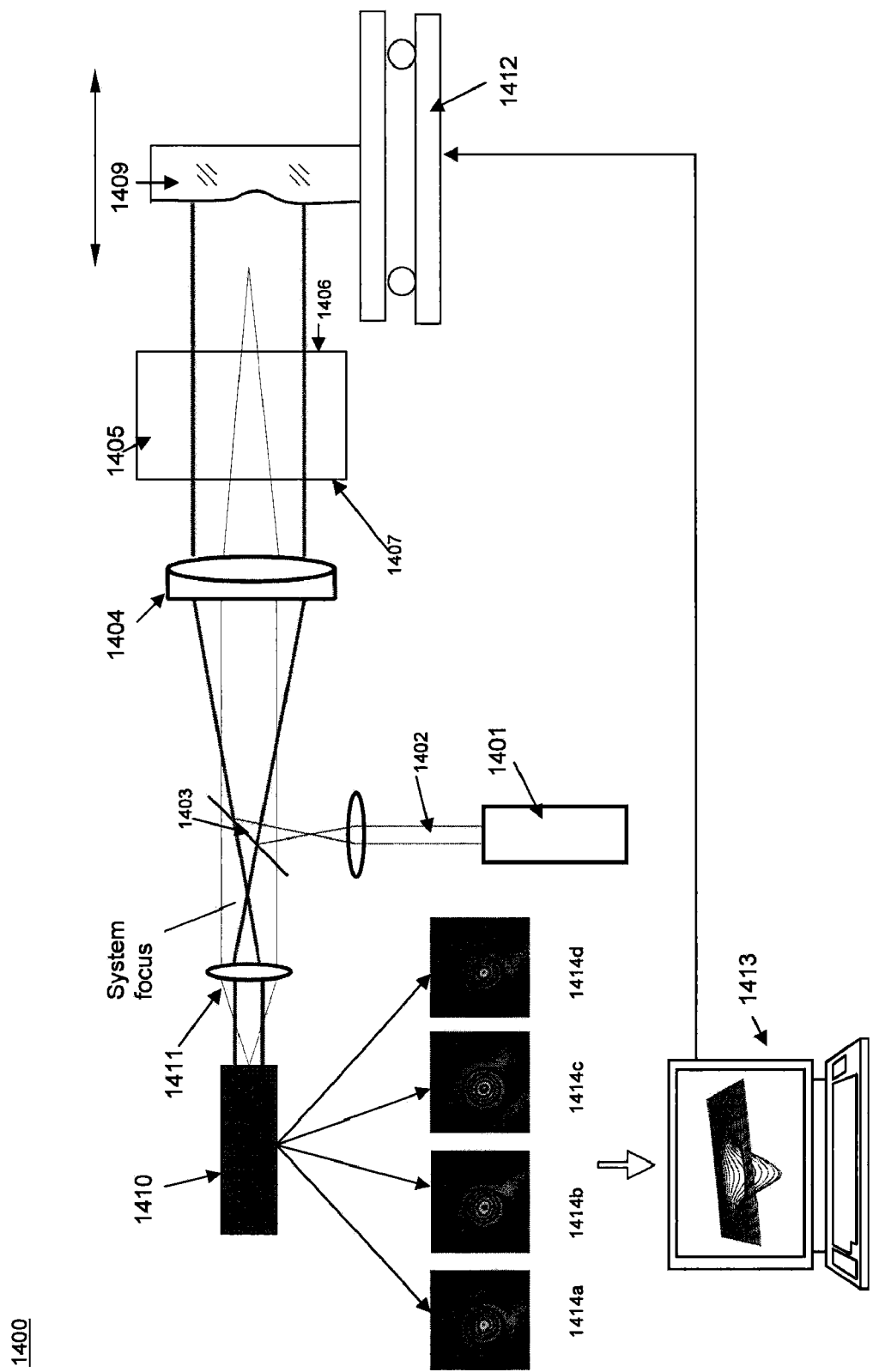
FIG. 14 is a schematic diagram of a of a sinusoidal phase-shifting interferometer system with a camera system.

Referring to FIG. 14, a sinusoidal phase shifting interferometer system 1400 employs camera system 1410 for capturing the phase shifted interference images at high speed and integrating them in separate accumulators based on time sequencing, of the type described in U.S. Provisional Application No. 60/778,354 "PHASE SHIFTING INTERFEROMETER SYSTEM WITH CAMERA SYSTEM FEATURING MULTIPLE ACCUMULATORS" filed Mar. 2, 2006, incorporated herein by reference. For example, in some embodiments, camera system 1410 features a cyclic camera of the type described in U.S. Provisional application Ser. No. 11/365,752 "CYCLIC CAMERA" filed Feb. 28, 2006, incorporated herein by reference. This pictured embodiment includes a phase shifting interferometer system 1400 featuring a Fizeau geometry. A laser source 1401 provides source light 1402. The chief rays of the source light are indicated with black solid lines. The marginal rays of imaging system 1412 are shown as light grey lines. The source light is directed onto a beam splitter 1403, which in turn directs light through a collimator lens 1404. The light is then directed onto a partially transparent reference object 1405 (e.g., a high quality optical flat, as shown). The back surface 1406 of the reference object defines a reference surface, while the front surface 1407 has an antireflective coating and may additionally be tilted with respect to the back surface so that reflections from the front surface do not take part in any subsequent measurements. A portion of the source light 1402 is reflected off of the reference surface, defining reference light. The remainder of the source light passes through the reference object and is directed to measurement object 1409. Light reflects off of the surface of the measurement object, defining measurement light. The measurement light passes back through the reference object to recombine with the reference light. The combined light 1408 is imaged onto a camera system 1410 by an imaging system 1412 composed of collimator 1404 and final lens 1411.

The combined light produces an interference pattern of varying intensity on the photosensitive elements (e.g., pixels) of camera system 1410. Spatial variations in the intensity profile of the optical interference pattern correspond to phase differences between the combined measurement and reference wavefronts caused by variations in the profile of the measurement surface relative to the reference surface. The camera system 1410 converts the interference pattern to electronic intensity data.

The relative phase between the measurement and reference light is shifted by applying a sinusoidal phase shift. The measurement object 1409 is mounted on mechanical stage 1412 controlled by computer 1413 (e.g., a piezo-electric transducer stage) which allows the measurement object to be moved continuously towards or away from the reference object in a sinusoidal pattern. Thus, the optical path difference between the reference and measurement beams is varied sinusoidally, providing a sinusoidal phase shift with a frequency which depends on the speed of the object motion. In alternate embodiments, the sinusoidal phase shift is provided by other modulating means including, for example, a wavelength tunable laser diodes, acousto-optic modulator, or heterodyne laser source. The sinusoidal phase shift frequency can be at high frequencies for example, about 10 kHz or more, up to several MHz or more.

The camera system in FIG. 14 is configured to integrate images of the interference pattern at distinct portions of each cycle of the sinusoidal phase shift. To achieve this, the intensity data are repeatedly shunted to separate accumulators 1414*a*, 1414*b*, 1414*c*, 1414*d* at specific times corresponding to a specific portion of a cycle of the sinusoidal phase shift. The embodiment shown in FIG. 14 features four accumulators 1414*a*, 1414*b*, 1414*c*, 1414*d* accumulate interference data for four portions of the cycle. In other embodiments, more or fewer accumulators are provided. Various embodiments of the camera system are discussed in detail in the references cited above.

At the end of the integration time the interference data collected by the camera system is read out to a computer and analyzed using a sinusoidal phase shift algorithm to produce, for example, a surface profile for the measurement object. The integration period may be thought of as the inverse of the camera frame rate of an ordinary camera. For example, a 0.02 sec integration time corresponds to a 50 Hz frame rate. However, the phase shift frequency may be very much higher than this, e.g., greater than 1 kHz, or even greater than 10 kHz and up to several megahertz (such as is possible by using an acousto-optic modulator). In embodiments where the phase shift frequency is set to be higher than the frequency of any environmental or other disturbance, the data acquisition is equivalent to a near instantaneous measurement of interference images over multiple consecutive cycles of the sinusoidal phase shift with a negligible time lag between the images. The integration time (the frame period) need only be short enough to avoid fringe contrast loss for large-amplitude, low-frequency disturbances.

Figure 15:
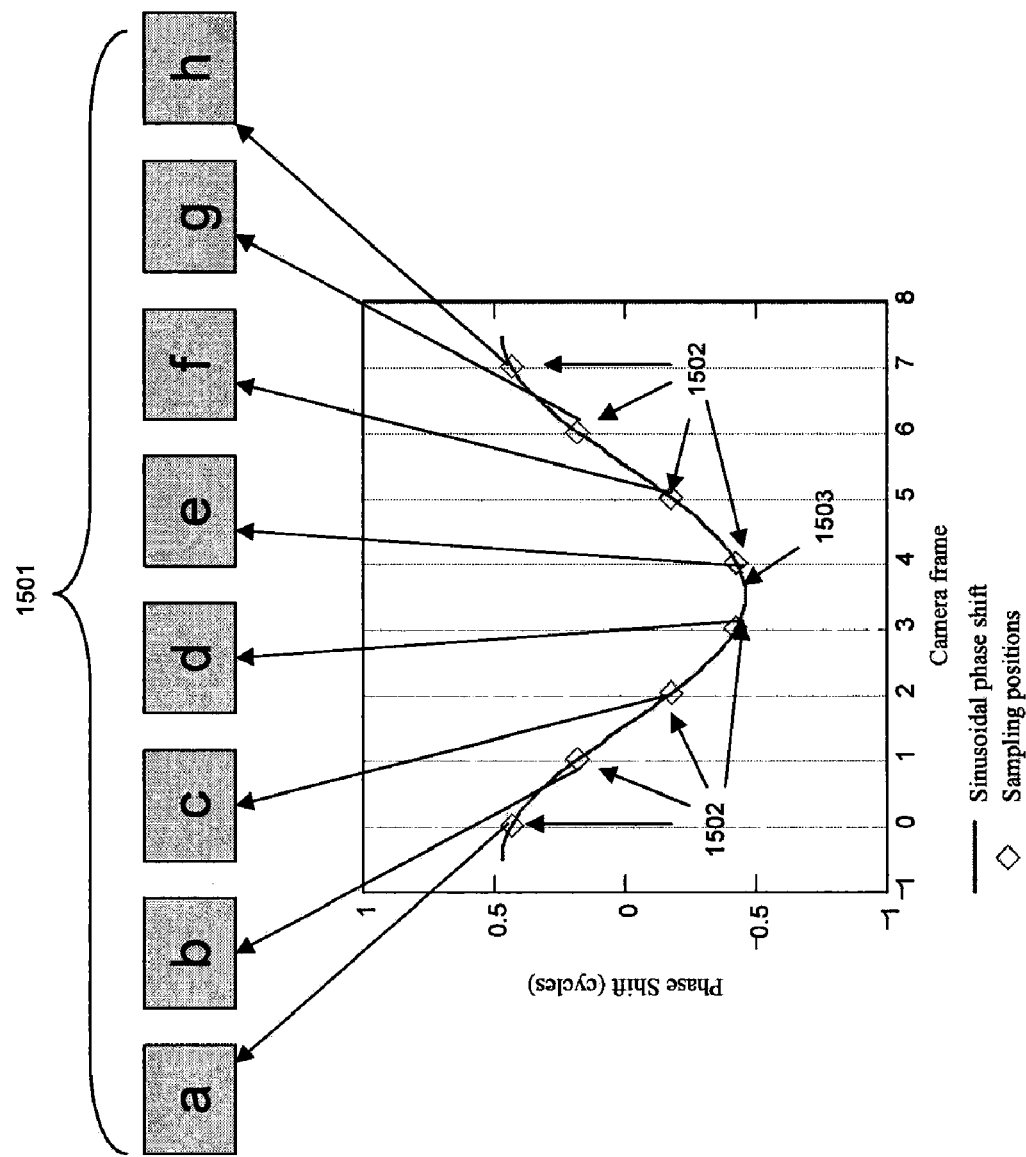
FIG. 15 is a schematic illustrating the time dependent shunting of intensity data to separate accumulators.

FIG. 15 illustrates the operation of a camera system with eight accumulators in a sinusoidal PSI system featuring an eight sample algorithm of the type described above. FIG. 15 illustrates the time-dependent shunting of intensity data into a bank of accumulators 1501, labeled a through h, at eight distinct portions 1502 of the sinusoidal phase shift cycle 1503. For each cycle, the intensity value of the interference signal at each of eight distinct portions of the phase shift cycle is shunted to a separate accumulator. As process is repeated over several cycles, the measured intensity values for each of the repeated distinct portions 1502 are integrated in the corresponding accumulators. After an integration period, the values stored in each accumulator are then read out to a computer or other data processor.

Figure 16:
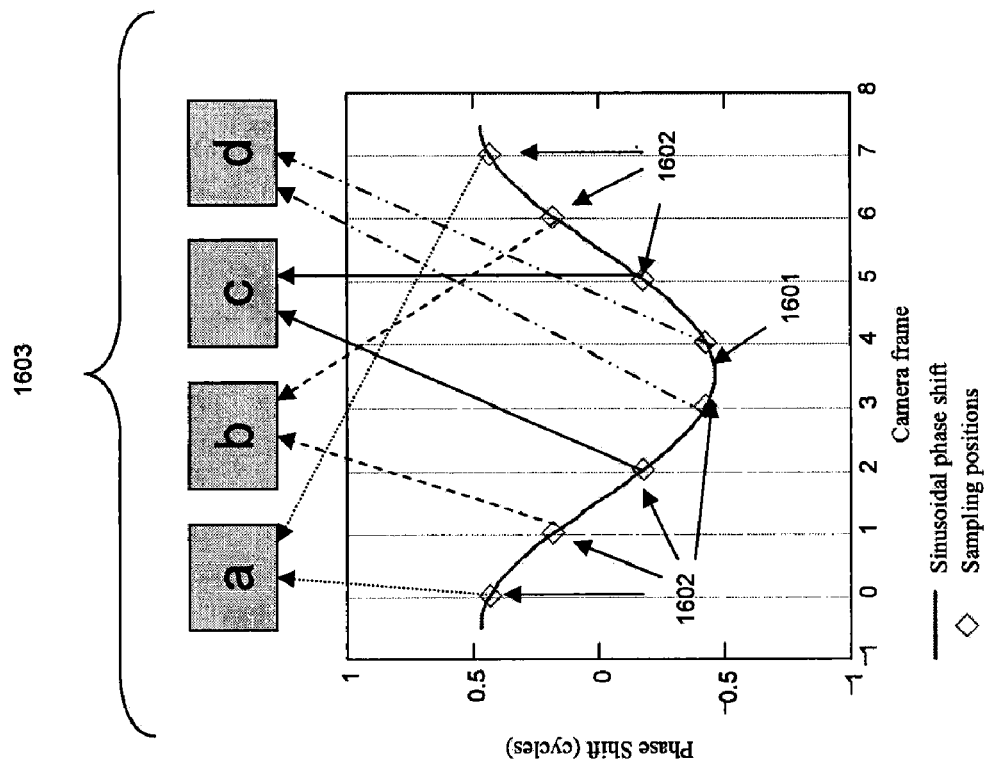
FIG. 16 is a schematic illustrating an alternate scheme for time dependent shunting of intensity data to separate accumulators.

In some embodiments, intensity dated is acquired at sampling positions arranged symmetrically about the midpoint of the sinusoidal phase shift cycle. In some such embodiments, the camera system features fewer accumulators than the number of samples per cycle. FIG. 16 illustrates the use of a camera system with four accumulators in a sinusoidal PSI system featuring an eight sample position algorithm of the type described above. The sample positions 1602 are arranged symmetrically, such that the phase shift at the first sample position is equal to that at the eight position, the phase shift at the second sample position is equal to that at the seventh sample positions, and so forth. During the first half of the sinusoidal phase shift cycle, intensity data at the first four sampling positions are shunted to accumulators 1603 labeled a, b, c, d respectively. During the second half of the cycle, the second four sample points are shunted to accumulators 1603 labeled d, c, b, a respectively. For each cycle, two sample points having equal phase shift values are integrated together in each accumulator. The process is repeated over several cycles. After an integration period, the values stored in each accumulator are then read out to a computer or other data processor.

A number of embodiments have been described. Other embodiments are possible

The above described interferometer systems may be used to measure various characteristics of a measurement object including, for example, surface profile, topography, or thin film structure. In general, the above described techniques can be used to measure any characteristic of the test object that manifests itself in an interference signal. In certain embodiments, the above described techniques can be used to measure for example, optically under-resolved features, complex thin films, varying material types, etc.

In some embodiments, the interferometer system may be used to determine optical wavefront shape or quality. Furthermore, the system can be used on measurement or reference objects with any of plano, spherical, or aspheric geometries.

The interferometer described in the embodiments above may be replaced an interference microscope, or by an interferometer with any suitable geometry including, for example, Linnik, Mirau, Fabry-Perot, Twyman-Green, Fizeau, point-diffraction, Michelson, or Mach-Zeder geometries. In some embodiments, test light is transmitted through the test object an subsequently combined with the reference light.

In general, the phase difference information or other measured characteristics can be output in a variety of ways. In some embodiments, the information can be output graphically or numerically to an electronic display or a printer. In certain embodiments, the spatial information can be output to memory (e.g., to random access memory or written to non-volatile magnetic, optical, or other memory). In some embodiments, the information can be output to a control system, such a wafer handling control system, which can adjust its operation based on the spatial information. For example, the system can adjust the position or orientation of the measurement object based on the information.

Any of the functions described above in connection with the phase shifting interferometer (e.g., generating a phase shift frequency, controlling one or more modulators, controlling a wavelength tuned light source, etc), the camera (e.g., accumulation or storage of interference pattern data, transfer of data between accumulators, synchronization with a phase shift frequency, control of shutters or other optical elements, etc.), and subsequent data analysis can be implemented in hardware or software, or a combination of both. The methods can be implemented in computer programs using standard programming techniques following the method and figures described herein. Program code is applied to input data to perform the functions described herein and generate output information. The output information is applied to one or more output devices such as a display monitor. Each program may be implemented in a high level procedural or object oriented programming language to communicate with a computer system. However, the programs can be implemented in assembly or machine language, if desired. In any case, the language can be a compiled or interpreted language. Moreover, the program can run on dedicated integrated circuits preprogrammed for that purpose.

Each such computer program is preferably stored on a storage medium or device (e.g., ROM or magnetic diskette) readable by a general or special purpose programmable computer, for configuring and operating the computer when the storage media or device is read by the computer to perform the procedures described herein. The computer program can also reside in cache or main memory during program execution. The analysis method can also be implemented as a computer-readable storage medium, configured with a computer program, where the storage medium so configured causes a computer to operate in a specific and predefined manner to perform the functions described herein.

The term sinusoidal phase shift is to be understood to include phase shifts which deviate from perfect sinusoids. For example, the error which results from the deviation from a perfect sinusoid may be predicted using the formalism of Eqs. (147)-(157). For a given embodiment, as long as this predicted error is not so large as to preclude, for example, determining the phase difference θ to a desired level of accuracy, the imperfect sinusoidal phase shift is suitable.

For example, FIG. 17 shows the sensitivity of the above described algorithms to phase shift nonlinearity at various orders as calculated using Eqs. (147)-(157). The table entries are the coefficients of the nonlinearity value $\zeta$. These numbers may be multiplied $\zeta$ to obtain the standard deviation over θ of the resulting phase error. For those cases where the dependence on $\zeta$ is nonlinear, the coefficient represents the ratio of the phase error to the amplitude of the nonlinearity at a nominal value of $\zeta=10\%$. Note that, for $\zeta=10\%$ the 16 sample position algorithm has negligible sensitivity to nonlinearity for n=2, 3, 4. Thus a sinusoidal phase shift with nonlinearities of fourth order or lower characterized by a value $\zeta \leq 10\%$ would be suitable for use with the sixteen sample position algorithm.

The phase estimation algorithms described herein may also be used for other purposes, e.g. measurements of signal strength. Defining the signal strength in Eq. (8) as M=qV, the calculated value for the signal strength found from the square root of the sum of the squares of the sine and cosine of the angle θ is $$M = \sqrt{\left(\frac{R_{odd}(\theta)}{\Gamma_{odd}}\right)^2 + \left(\frac{R_{even}(\theta)}{\Gamma_{even}}\right)^2} \qquad (167)$$

where $R_{odd}(\theta)$, $R_{even}(\theta)$ re defined by Eqs. (28), (29). Note that Eq. (167) is in principle independent of the angle θ. The measurement of signal strength is one way to determine the correct sinusoidal modulation amplitude u. Using Eq. (167) iteratively over a range of candidate modulation amplitudes, one can identify the correct modulation amplitude u for example by finding the peak measured signal strength.

Alternative methods for calibrating the correct modulation amplitude u include determining the ratios of two or more even frequencies and/or two or more odd frequencies. For example, in Eq. (19), when u=3, the first-order Bessel function decreases with u whereas the third-order Bessel function increases with u. Balancing these two Bessel functions, which correspond to two different signal frequencies, provides a means of establishing the value of u.

Although several specific algorithms are presented as examples above, it is to be understood that, in some embodiments, other algorithms may be used. For example, as discussed above, different values of weights $w_j^{(1)}$ and $w_j^{(2)}$ may be selected, based on a model of the interference signal and considerations such as the types and characteristics of noise to be compensated.

Although several specific algorithms are presented as examples above, it is to be understood that Other embodiments are in the following claims.

What is claimed is:
1. A method comprising:
 combining a first light beam and at least a second light beam to form a combined light beam;
 introducing a sinusoidal phase shift with a frequency f between a phase of the first light beam and a phase of the second light beam;

recording at least one interference signal based on a modulation of the combined light beam in response to the sinusoidal phase shift, the interference signal comprising at least three different frequency components, wherein each of the at least three different frequency components has a frequency which is an integer multiple of f;

for each interference signal, determining information related to the difference in optical path lengths of the first and second light beam by comparing the intensity of the at least three different frequency components of the interference signal; and outputting the information, wherein the comparing comprises assigning a respective weight to the intensity of each of the at least three different frequency components to provide a corresponding weighted intensity; and comparing the weighted intensities, the respective weights being selected to compensate an error, where the respective weights are selected so that the effect of the error on the weighted intensity corresponding to a first frequency component is compensated by the effect of the error on the weighted intensity corresponding to a second frequency component.

2. The method of claim 1, wherein the comparing further comprises:

comparing a sum of the weighted intensities corresponding to the at least three different frequency components at even multiples of f to a sum of the weighted intensities corresponding to the at least three different frequency components at odd multiples of f.

3. The method of claim 2, wherein the respective weights are selected so that the effect of an error on the intensity of a first of the at least three different frequency components is compensated by the effect of the error on the intensity of a second of the at least three different frequency components.

4. The method of claim 3 wherein the frequencies of the first and second frequency components are same-parity integer multiples of f.

5. The method of claim 1, wherein the at least three different frequency components comprise at least one frequency component with frequency greater than twice f.

6. The method of claim 1 wherein each of the at least three different frequency components has a frequency greater than three times f.

7. The method of claim 1, wherein the error comprises a variation in the excursion of the sinusoidal phase shift from a nominal value.

8. The method of claim 1, wherein the error comprises additive random noise.

9. The method of claim 1, wherein the error comprises additive synchronous noise.

10. The method of claim 9, wherein the additive synchronous noise comprises noise at frequency v″, and the at least three different frequency components do not comprise a component with frequency v″.

11. The method of claim 1, wherein the error comprises multiplicative synchronous noise.

12. The method of claim 1, wherein the error comprises synchronous vibration noise.

13. The method of claim 12, wherein the synchronous vibration noise comprises noise at low frequencies, and the at least three different frequency components have frequencies greater than the low frequencies.

14. The method of claim 1, wherein the error comprises phase shift nonlinearity.

15. The method of claim 14, wherein the nonlinearity comprises a quadratic nonlinearity, and the at least three frequency components do not comprise a frequency component with a frequency equal to 2f.

16. The method of claim 1, wherein the error comprises phase shift calibration error.

17. The method of claim 1, wherein the error comprises phase shift timing offset error.

18. The method of claim 1, wherein the recording comprises sampling the interference signal at a sample rate.

19. The method of claim 18, wherein the Nyquist frequency corresponding to the sample rate is greater than the frequency of each of the at least three different frequency components.

20. The method of claim 18, wherein the Nyquist frequency corresponding to the sample rate is greater than three times f.

21. The method of claim 18, the Nyquist frequency corresponding to the sample rate is greater than seven times f.

22. The method of claim 1, wherein the sinusoidal phase shift ϕ(t) is of the form $$\phi(t) = u \cos[\alpha(t) + \varphi]$$

where u is the excursion of the sinusoidal phase shift, ϕ is a timing offset, and $$\alpha(t) = 2\pi f t$$

is the scaled time dependence with f equal to the frequency of the sinusoidal phase shift.

23. The method of claim 22, wherein the recording comprises, during a cycle of the sinusoidal phase shift, acquiring intensity data $\bar{g}_j$ for N successive sample positions each corresponding to a time $t_j$, where $j = 0, 1, 2, \ldots N-1$.

24. The method of claim 23, further comprising arranging the sample positions symmetrically about the midpoint of a cycle of the sinusoidal phase shift such that $$\cos(\alpha(t_j) + \varphi) = \cos(\alpha(t_{N-1-j}) + \varphi)$$

for $j = 0, 1, 2, \ldots (N-1)/2$.

25. The method of claim 22, comprising providing a sinusoidal phase shift excursion u large enough that the interference signal recorded in response to the phase shift comprises frequency components with frequencies at three distinct integer multiples of f.

26. The method of claim 22, comprising providing a sinusoidal phase shift excursion u great enough that the interference signal recorded in response to the phase shift comprises frequency components at the first six integer multiples of f.

27. The method of claim 22 where $u > \pi/2$ radians.

28. A method comprising:

combining a first light beam and at least a second light beam to form a combined light beam;

introducing a sinusoidal phase shift with a frequency f between a phase of the first light beam and a phase of the second light beam;

recording at least one interference signal based on a modulation of the combined light beam in response to the sinusoidal phase shift, the interference signal comprising at least three different frequency components;

for each interference signal, determining information related to the difference in optical path lengths of the first and second light beam by comparing the intensity of the at least three different frequency components of the interference signal; and outputting the information, wherein the sinusoidal phase shift ϕ(t) is of the form $$\phi(t) = u \cos[\alpha(t) + \varphi]$$

where u is the excursion of the sinusoidal phase shift, φ is a timing offset, and $$\alpha(t) = 2\pi ft$$

is the scaled time dependence with f equal to the frequency of the sinusoidal phase shift, the recording comprises, during a cycle of the sinusoidal phase shift, acquiring intensity data $\bar{g}_j$ for N successive sample positions each corresponding to a time $t_j$, where j=0, 1, 2, ... N−1, and the determining comprises:
  assigning a first respective weight $w_j^{(1)}$ to each of the intensity data $\bar{g}_j$ to provide a corresponding first weighted intensity;
  assigning a second respective weight $w_j^{(2)}$ to each of the intensity data $\bar{g}_j$ to provide a corresponding second weighted intensity;
  calculating the ratio of the sum of first weighted intensities to the sum of the second weighted intensities; and
  determining information related to the difference in optical path lengths based on the ratio.

29. The method of claim 28, comprising selecting the first and second respective weights to compensate an error.

30. The method of claim 29, wherein the timing offset is set to a nominal value φ=0.

31. The method of claim 30, wherein the excursion u is set to a nominal value.

32. The method of claim 31, wherein $$w_j^{(1)} = \Gamma_{even} \times (h_{odd})_j$$

and $$w_j^{(2)} = \Gamma_{odd} \times (h_{even})_j$$

where $(h_{odd})_j$ is the $j^{th}$ element of a sampling vector $h_{odd}$, $(h_{even})_j$ is the $j^{th}$ element of a sampling vector $h_{even}$ and $\Gamma_{even}$ and $\Gamma_{odd}$ are normalization coefficients based on a model of the interference signal.

33. The method of claim 32, wherein the sampling vectors $h_{odd}$, $h_{even}$ are selected subject to the constraints $$\sum_j (h_{odd})_j (h_{even})_j = 0.$$

$$\sum_j (h_{odd})_j \cos[v(\alpha_j + \varphi)] = 0 \quad \text{for } v = 2, 4, 6 \ldots$$

and $$\sum_j (h_{even})_j \cos[v(\alpha_j + \varphi)] = 0 \quad \text{for } v = 1, 3, 5 \ldots.$$

34. The method of claim 33, wherein the error comprises a variation in the excursion of the sinusoidal phase shift from the nominal value.

35. The method of claim 34, wherein the sampling vectors $h_{odd}$, $h_{even}$ are selected such that the ratio of the normalization coefficients remains stable in response to the variation of the excursion from the nominal value.

36. The method of claim 33, wherein the error comprises additive random noise.

37. The method of claim 36, wherein the additive random noise comprises mean noise.

38. The method of claim 37, wherein the sampling vectors $h_{odd}$, $h_{even}$ are selected subject to the constraint $$\frac{\Gamma_{odd}}{p_{odd}} = \frac{\Gamma_{even}}{p_{even}}$$

where $$p_{odd} = \sqrt{\sum_j (h_{odd})_j^2},$$

$$p_{even} = \sqrt{\sum_j (h_{even})_j^2}.$$

39. The method of claim 36, wherein the additive random noise comprises root mean square noise.

40. The method of claim 39, wherein the sampling vectors $h_{odd}$, $h_{even}$ are selected subject to the constraint that the magnitude of the quantities $\Gamma_{odd}/p_{odd}$ and $\Gamma_{even}/p_{even}$ be maximized where $$p_{odd} = \sqrt{\sum_j (h_{odd})_j^2},$$

$$p_{even} = \sqrt{\sum_j (h_{even})_j^2}.$$

41. The method of claim 33, wherein the error comprises additive synchronous noise.

42. The method of claim 41, wherein the additive synchronous noise comprises noise at frequency v″, and the sampling vectors $h_{odd}$, $h_{even}$ are selected subject to the constraint that the magnitude of the quantities $$\sum_j (h_{odd})_j \cos[v''(\alpha_j + \varphi)]$$

and $$\sum_j (h_{even})_j \cos[v''(\alpha_j + \varphi)]$$

be minimized.

43. The method of claim 33, wherein the error comprises multiplicative synchronous noise.

44. The method of claim 43, wherein the multiplicative synchronous noise comprises noise at frequency v″, and the sampling vectors $h_{odd}$, $h_{even}$ are selected to minimize a predicted sensitivity of the determined information to the noise at frequency v″, based on the model of the interference signal.

45. The method of claim 43, wherein the multiplicative synchronous noise comprises a sinusoid with frequency f oscillating in phase with the sinusoidal phase shift; and
  the sampling vectors $h_{odd}$, $h_{even}$ are selected subject to the constraint that the magnitude of the quantities $$\sum_j (h_{odd})_j \cos[(\alpha_j + \varphi)]$$

and $$\sum_j (h_{even})_j \cos[(\alpha_j + \varphi)]$$

be minimized.

46. The method of claim 45, wherein:
the common source comprises a laser diode;
the providing a sinusoidal phase shift comprises sinusoidally varying the wavelength of a diode laser light source; and
the multiplicative synchronous noise is diode laser intensity noise.

47. The method of claim 33, wherein the error comprises synchronous vibration noise.

48. The method of claim 47, wherein the synchronous vibration noise comprises noise at frequency $v''$, and sampling vectors $h_{odd}$, $h_{even}$ are selected to minimize a predicted sensitivity of the determined information to the noise at frequency $v''$, based on the model of the interference signal.

49. The method of claim 33, wherein the error comprises nonlinearity of the sinusoidal phase shift.

50. The method of claim 49, wherein the nonlinearity is a quadratic nonlinearity, and the sampling vectors $h_{odd}$, $h_{even}$ are selected subject to the constraint that the magnitude of the quantities $$\sum_j (h_{odd})_j \cos[2(\alpha_j + \varphi)]$$

and $$\sum_j (h_{even})_j \cos[2(\alpha_j + \varphi)]$$

be minimized.

51. The method of claim 33, wherein the error comprises phase shift timing offset error.

52. The method of claim 51, wherein sampling vectors $h_{odd}$, $h_{even}$ are selected subject to the constraint that the magnitude of the quantity $$\frac{\Gamma_{even}(\varphi + \delta\varphi)}{\Gamma_{odd}(\varphi + \delta\varphi)} \frac{\Gamma_{odd}(\varphi)}{\Gamma_{even}(\varphi)} - 1$$

be minimized, where $\varphi$ is a nominal value for the timing offset and $\delta\varphi$ is the deviation from the nominal value.

53. The method of claim 28, wherein the determining comprises calculating the inverse tangent of the ratio.

54. The method of claim 28, wherein:
the recording comprises acquiring intensity data $\bar{g}_j$ for N=8 successive measurement frames each corresponding to a time $t_j$ such that $\alpha(t_j)=j\pi/4+\pi/8$ for $j=0, 1, 2, \ldots 7$; and
the determining comprises calculating a value for the phase difference $\theta$ between the phase of first light beam and the phase of the second light beam based on the expression:

$$\theta = \tan^{-1}\left(\frac{1.6647(g_1 - g_2)}{-g_0 + g_1 + g_2 - g_3}\right),$$

where $g_i = \bar{g}_i + \bar{g}_{7-i}$, for $i=0, 1, 2, 3$.

55. The method of claim 54, where in the sinusoidal phase shift excursion u is set to a nominal value of 2.93 radians and the timing offset $\phi$ is set to a nominal value of 0.

56. The method of claim 28, wherein:
the recording comprises acquiring intensity data $\bar{g}_i$ for N=16 successive measurement frames each corresponding to a time $t_j$ such that $\alpha(t_j)=j\pi/8+\pi/16$ for $j=0, 1, 2, \ldots 7$; and
the determining comprises calculating a value for the phase difference $\theta$ between the phase of first light beam and the phase of the second light beam based on the expression:

$$\theta = \tan^{-1}\left(\frac{2.646(-g_0 + g_7) + 7.248(g_1 - g_6) +}{1.375(g_0 + g_7) + 1.410(g_1 + g_6) +} \frac{2.507(-g_2 + g_5) + 6.758(-g_3 + g_4)}{8.099(-g_2 - g_5) + 5.314(g_3 + g_4)}\right),$$

where $g_i = \bar{g}_i + \bar{g}_{15-i}$, for $i=0, 1, \ldots 7$.

57. The method of claim 56, where in the sinusoidal phase shift excursion u is set to a nominal value of 5.9 radians and the timing offset $\phi$ is set to a nominal value of 0.

58. The method of claim 1, wherein the comparing comprises:
calculating a frequency transform of the interference signal at each of at least three frequencies; and
comparing the magnitudes of the calculated frequency transforms to determine information related to the difference in optical path lengths of the first and second light beam.

59. The method of claim 58 wherein the at least three frequencies are integer multiples of the sinusoidal phase shift frequency.

60. The method of claim 59, further comprising:
extracting the phases of one or more of the calculated frequency transforms, and determining additional information based on the extracted phases.

61. The method of claim 60, wherein the additional information is a value of the excursion of the sinusoidal phase shift.

62. The method of claim 60, wherein the additional information is a value of a timing offset.

63. The method of claim 58, wherein the frequency transforms are Fourier Transforms.

64. The method of claim 58, wherein the frequency transforms are Fast Fourier Transforms.

65. The method of claim 58, wherein the frequency transforms are Discrete Cosine Transforms.

66. The method of claim 64, wherein the Nyquist frequencies of the Fast Fourier Transforms are greater than three times f.

67. The method of claim 65, wherein the Nyquist frequencies of the Discrete Cosine Transforms are greater than three times f.

68. The method of claim 1, wherein the combining comprises
directing the first light beam to a first surface, directing the second light beam to a second surface, and forming an optical interference image from the combined light beam;
wherein the at least one interference signals each correspond to different location on the interference image.

69. The method of claim 68, wherein the information comprises a surface profile of one of the surfaces.

70. A system comprising:
an interferometer which during operation combines a first light beam and a second light beam derived from a common source to form combined light beam;
a phase shifting component which during operation introduces a sinusoidal phase shift between a phase of the first light beam and a phase of the second light beam;
a camera positioned to detect the combined light beam and simultaneously provide at least one interference signal for each of multiple spatial locations on the camera based on the modulation of the combined light beam in response to the phase shift; and an electronic controller coupled to the phase shifting component and the camera, wherein the controller is configured to: determine information related to the difference in optical path lengths of the first and second light beam by comparing the intensity of at least three frequency components of the interference signals.

71. The system of claim 70, wherein the interferometer is a Fizeau interferometer.

72. The system of claim 70, wherein the interferometer is an unequal path interferometer, and the phase-shifting component is configured to vary the wavelength at least one of the light beams.

73. The system of claim 72, wherein the phase shifting component is a wavelength tunable diode laser.

74. The system of claim 70, wherein the first light beam is directed to a surface and the phase-shifting component is a transducer coupled to the surface.

75. The system of claim 70, wherein the phase-shifting component is an acousto-optic modulator.

76. The system of claim 70, wherein the phase-shifting component is an electro-optic modulator.

77. The system of claim 70, wherein:
the interferometer during operation directs the first light beam to a first surface, directs the second light beam to a second surface and forms an optical interference image from the combined light beam; and
the at least one interference signals each correspond to different location on the interference image.

78. The system of claim 77, wherein the information comprises a surface profile of one of the surfaces.

79. A method comprising:
combining a first light beam and at least a second light beam to form a combined light beam;
introducing a sinusoidal phase shift with a frequency f between a phase of the first light beam and a phase of the second light beam;
recording at least one interference signal based on a modulation of the combined light beam in response to the sinusoidal phase shift, the interference signal comprising at least three different frequency components;
for each interference signal, determining information related to the difference in optical path lengths of the first and second light beam by comparing the intensity of the at least three different frequency components of the interference signal, wherein each of the at least three different frequency components has a frequency which is an integer multiple of f; and
outputting the information,
wherein the comparing comprises assigning a respective weight to the intensity of each of the at least three different frequency components to provide a corresponding weighted intensity and comparing a sum of the weighted intensities corresponding to the at least three different frequency components at even multiples of f to a sum of the weighted intensities corresponding to the at least three different frequency components at odd multiples of f.

80. A method comprising:
combining a first light beam and at least a second light beam to form a combined light beam;
introducing a sinusoidal phase shift with a frequency f between a phase of the first light beam and a phase of the second light beam;
simultaneously recording an interference signal for each of multiple spatial locations on a camera based on a modulation of the combined light beam in response to the sinusoidal phase shift, the interference signals comprising at least three different frequency components;
for each interference signal, determining information related to the difference in optical path lengths of the first and second light beam by comparing the intensity of the at least three different frequency components of the respective interference signal; and
outputting the information.

81. A system comprising:
an interferometer which during operation combines a first light beam and a second light beam derived from a common source to form combined light beam;
a phase shifting component which during operation introduces a sinusoidal phase shift between a phase of the first light beam and a phase of the second light beam;
a photo detector positioned to detect the combined light beam and provide at least one interference signal based on the modulation of the combined light beam in response to the phase shift; and
an electronic controller coupled to the phase shifting component and the photo detector, wherein the controller is configured to: determine information related to the difference in optical path lengths of the first and second light beam by comparing the intensity of at least three frequency components of the interference signal,
wherein the interferometer is an unequal path interferometer, and the phase-shifting component is a wavelength tunable diode laser configured to vary the wavelength at least one of the light beams.

82. A system comprising:
an interferometer which during operation combines a first light beam and a second light beam derived from a common source to form combined light beam;
a phase shifting component which during operation introduces a sinusoidal phase shift between a phase of the first light beam and a phase of the second light beam;
a photo detector positioned to detect the combined light beam and provide at least one interference signal based on the modulation of the combined light beam in response to the phase shift; and
an electronic controller coupled to the phase shifting component and the photo detector, wherein the controller is configured to: determine information related to the difference in optical path lengths of the first and second light beam by comparing the intensity of at least three frequency components of the interference signal,
wherein the phase-shifting component is an acousto-optic modulator, an electro-optic modulator, or a transducer coupled to a surface to which the first light beam is directed.

* * * * *

UNITED STATES PATENT AND TRADEMARK OFFICE
CERTIFICATE OF CORRECTION

| | | |
|---|---|---|
| PATENT NO. | : 7,933,025 B2 | Page 1 of 1 |
| APPLICATION NO. | : 11/958175 | |
| DATED | : April 26, 2011 | |
| INVENTOR(S) | : Peter J. De Groot | |

It is certified that error appears in the above-identified patent and that said Letters Patent is hereby corrected as shown below:

In the Specification

Column 1, line 11, delete "2007" and insert --2006--.

Column 41, line 37, claim 32, delete "$(h_{odd})$" and insert --$(h_{odd})_j$--.

Column 45, line 57, claim 79, delete "off" and insert --of f--.

Signed and Sealed this
Twenty-third Day of August, 2011

David J. Kappos
*Director of the United States Patent and Trademark Office*